US008370644B2

(12) United States Patent
Handschuh et al.

(10) Patent No.: US 8,370,644 B2
(45) Date of Patent: Feb. 5, 2013

(54) INSTANT HARDWARE ERASE FOR CONTENT RESET AND PSEUDO-RANDOM NUMBER GENERATION

(75) Inventors: Helena Handschuh, Paris (FR); Arnaud Boscher, Puteaux (FR); Elena Trichina, Munich (DE); Joël Le Bihan, Nantes (FR); Nicolas Prawitz, Gif sur Yvette (FR); Frederic Cherpantier, Rueil Malmaison (FR); Jimmy Lau, Santa Clara, CA (US)

(73) Assignee: Spansion LLC, Sunnyvale, CA (US)

( * ) Notice: Subject to any disclaimer, the term of this patent is extended or adjusted under 35 U.S.C. 154(b) by 1118 days.

(21) Appl. No.: 12/129,737

(22) Filed: May 30, 2008

(65) Prior Publication Data
US 2009/0300312 A1    Dec. 3, 2009

(51) Int. Cl.
*H04L 9/00* (2006.01)

(52) U.S. Cl. ............ 713/193; 713/2; 713/189; 380/264; 726/3

(58) Field of Classification Search .................... 713/193
See application file for complete search history.

(56) References Cited

U.S. PATENT DOCUMENTS

| | | | | |
|---|---|---|---|---|
| 4,267,569 A | * | 5/1981 | Baumann et al. | 701/99 |
| 6,192,447 B1 | * | 2/2001 | Shand | 711/111 |
| 7,200,743 B1 | * | 4/2007 | Malpass | 713/1 |
| 7,577,851 B2 | * | 8/2009 | Inamura et al. | 713/189 |
| 7,945,792 B2 | * | 5/2011 | Cherpantier | 713/194 |
| 2002/0169960 A1 | * | 11/2002 | Iguchi et al. | 713/174 |
| 2004/0205314 A1 | * | 10/2004 | Babudri et al. | 711/163 |
| 2006/0020941 A1 | * | 1/2006 | Inamura et al. | 718/100 |
| 2006/0023486 A1 | * | 2/2006 | Furusawa et al. | 365/145 |
| 2006/0133155 A1 | * | 6/2006 | Fujita et al. | 365/185.29 |
| 2007/0121575 A1 | * | 5/2007 | Savry et al. | 370/351 |
| 2007/0143632 A1 | * | 6/2007 | Matsuzaki et al. | 713/193 |
| 2008/0279005 A1 | * | 11/2008 | France | 365/185.11 |

* cited by examiner

*Primary Examiner* — Kambiz Zand
*Assistant Examiner* — Yonas Bayou
(74) *Attorney, Agent, or Firm* — Turocy & Watson, LLP

(57) ABSTRACT

Systems and methods that facilitate securing data associated with a memory from security breaches are presented. A memory component includes nonvolatile memory, and a secure memory component (e.g., volatile memory) used to store information such as secret information related to secret processes or functions (e.g., cryptographic functions). A security component detects security-related events, such as security breaches or completion of security processes or functions, associated with the memory component and in response to a security-related event, the security component can transmit a reset signal to the secure memory component to facilitate efficiently erasing or resetting desired storage locations in the secure memory component in parallel and in a single clock cycle to facilitate data security. A random number generator component can facilitate generating random numbers after a reset based on a change in scrambler keys used by a scrambler component to descramble data read from the reset storage locations.

20 Claims, 11 Drawing Sheets

INSTANT HARDWARE ERASE FOR CONTENT RESET AND PSEUDO-RANDOM NUMBER GENERATION

BACKGROUND

A wide variety of memory devices can be used to maintain and store data and instructions for various computers and similar systems. For instance, flash memory is a type of electronic memory media that can be rewritten and retain content without consumption of power. Unlike dynamic random access memory (DRAM) devices and static random memory (SRAM) devices in which a single byte can be erased, flash memory devices are typically erased in fixed multi-bit blocks or sectors. Flash memory technology can include NOR flash and/or NAND flash, for example. NOR flash evolved from electrically erasable read only memory (EEPROM) chip technology, in which, unlike flash, a single byte can be erased; and NAND flash evolved from DRAM technology. Flash memory devices can be less expensive and denser as compared to many other memory devices, meaning that flash memory devices can store more data per unit area.

Flash memory has become popular, at least in part, because it combines the advantages of the high density and low cost of EPROM with the electrical erasability of EEPROM. Flash memory is non-volatile; it can be rewritten and can hold its content without power. It can be used in many portable electronic products, such as cellular phones, computers, voice recorders, thumbnail drives, and the like, as well as in many larger electronic systems, such as automobiles, airplanes, industrial control systems, etc. The fact that flash memory can be rewritten as well as its retention of data without a power source, small size, and light weight have all contributed to make flash memory devices a useful and popular means for transporting and maintaining data.

Many electronic devices and systems employ cryptographic and/or other processes to facilitate securing data, such as sensitive and/or personal information of a user, that is associated with the electronic device. Typically, such electronic devices, which can use non-volatile memory (e.g., flash memory), can also employ other memory, such as volatile memory (e.g., random access memory (RAM), static RAM, etc.), which can be utilized to store key information (e.g., secret key) and/or results (e.g., intermediate results) associated with cryptographic computations related to encrypting and/or decrypting data associated with the electronic device. Hackers or other unauthorized entities may attempt to access the volatile memory in order to learn the key information and/or results stored therein and/or glean other information related thereto in order to discover the data (e.g., sensitive and/or person information of the user), keys, and/or processes (e.g., cryptographic processes) used to secure the data. It is desirable to efficiently and securely manage data associated with an electronic device to minimize the risk of unauthorized and undesired access to or disclosure of such information.

Cryptographic and other processes often can employ random numbers (e.g., true random numbers, pseudo-random numbers) to facilitate securing data associated with a memory and/or electronic device. A random number generator can be used to generate random numbers. Conventionally, random number generators can employ cryptographic computations and/or a physical process to generate random numbers. Such conventional techniques for generating random numbers can be inefficient, for example, with regard to the time necessary to generate the random numbers, the resources used to generate the random numbers, and/or power used to generate the random numbers. It is desirable to efficiently generate random numbers to facilitate securing data, while also reducing or minimizing time, resources, and power expended to generate the random numbers.

SUMMARY

The following presents a simplified summary of the subject innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The subject innovation relates to systems, methods, and/or mechanisms that can facilitate securing data associated with a memory component (e.g., memory device) from unauthorized attempts to access or discover data associated with the memory component. In accordance with an aspect, a memory component can include a security component that can facilitate instantly erasing or resetting a secure memory component, or a desired portion thereof, within the memory component in a single clock cycle to facilitate securing data stored therein from unauthorized access or disclosure. The secure memory component can be utilized to store sensitive information, such as secret keys, results from cryptographic computations, and/or other information that can be utilized to facilitate securing data associated with the memory component. In one aspect, the security component can monitor activity associated with the memory component, such as events (e.g., tamper events) and/or security-related attributes (e.g., temperature of memory component, voltage level(s) associated with the memory component, etc.) associated with the memory component, to determine whether there is an attempt to tamper with or breach the security of the memory component. The security component can evaluate monitored event and/or security-related attribute information and can apply predetermined reset criteria to determine whether a security breach has occurred based in part on the predetermined reset criteria. If it is determined that a security breach has occurred, the security component can transmit a reset signal to the secure memory component, or can write to a dedicated register associated with the secure memory component, to erase or reset to a predefined value content stored in each storage location (e.g., memory cell), or a select subset of storage locations, in the secure memory component at the same time (e.g., in parallel) and in a single clock cycle to facilitate securing the memory component and data associated therewith.

For example, a sensor component in the security component can detect a breach based in part on predetermined reset criteria and can transmit a reset signal to the secure memory component to facilitate performing a reset or erase of desired storage locations therein in a single clock cycle. As another example, the sensor component can provide sensed information (e.g., temperature information, voltage information, etc.) associated with the memory component to a memory reset component in the security component, and the memory reset component can determine whether a security breach has occurred based in part on predetermined reset criteria, and, if the memory reset component determines that a security breach occurred, the memory reset component can transmit a reset signal to the secure memory component to facilitate performing a reset or erase of desired storage locations therein in a single clock cycle.

In accordance with another aspect, at a desired time, the security component can facilitate erasing or resetting all or a subset of storage locations in the secure memory component in a single clock cycle to facilitate securing the memory component and data associated therewith. For instance, to facilitate securing data associated with the memory component, secure processes, secure functions, and/or secure computations (e.g., cryptographic processes and computations) can be performed and information related to such secure processes, functions, and/or secure computations (e.g., intermediate computation results) can be stored in storage locations in the secure memory component. At a desired time, such as when the secure processes, functions, and/or secure computations are completed, the security component can receive information that the secure processes, secure functions, and/or secure computations are finished, and can transmit a reset signal, or can write to a dedicated register associated with the secure memory component, to reset to a predefined value, or erase content stored in, each storage location (e.g., memory cell), or a select subset of storage locations, in the secure memory component such that the reset or erase is performed at the same time and in a single clock cycle to facilitate securing the memory component and data associated therewith.

In accordance with one embodiment, the security component can employ a random number generator component that can be utilized to efficiently generate random numbers (e.g., pseudo-random numbers) that can be utilized to facilitate securing data associated with the memory (e.g., flash memory). In accordance with an aspect, the secure memory component can employ a scrambler component that can utilize scrambler keys to facilitate scrambling data written to storage locations in the secure memory component, and descrambling data read from the storage locations. In one aspect, when a reset is performed to reset or erase all or a portion of the storage locations in the secure memory component, the scrambler key can be changed, as desired, and, when the scrambler key is changed, a new set of random numbers (e.g., one or more pseudo-random numbers) can be generated by reading the predefined data value (e.g., 0) of the reset storage locations and descrambling the read data values using the new scrambler key. For example, a reset of a subset of storage locations in the secure memory component can be performed. When the scrambler key is changed (e.g., to different scrambler key), the data value (e.g., predefined data value of a storage location after a reset is performed) stored in the reset subset of storage locations can be read from those storage locations and can be descrambled using the new scrambler key, which can facilitate generating one or more pseudo-random numbers based in part on the new scrambler key. A random number generator component can receive descrambled sets of data (e.g., as descrambled with the new scrambler key) respectively associated with each storage location of the subset and can generate one or more pseudo-random numbers using the received descrambled sets of data (e.g., the descrambled sets of data can be utilized as pseudo-random numbers or can be further processed to generate pseudo-random numbers). If the scrambler component depends on the scrambler key and the input value, one pseudo-random number can be generated each time the scrambler key is changed. If the scrambler component depends on the respective memory addresses of the respective storage locations in the secure memory component, and the scrambler key and input values, a different pseudo-random number can be generated with regard to each storage location, which can result in a specified number of pseudo-random numbers being generated based in part on the number of storage locations from which the data is read and descrambled, each time the scrambler key is changed. As a result, one or more pseudo-random numbers can be generated quickly and efficiently.

In still another aspect, methods that can instantly erase data associated with a secure memory component to facilitate securing data are presented. In yet another aspect, a method that can facilitate generating pseudo-random numbers in an efficient manner to facilitate data security is presented.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and novel features of the disclosed subject matter will become apparent from the following detailed description of the innovation when considered in conjunction with the drawings.

DETAILED DESCRIPTION

Figure 1:
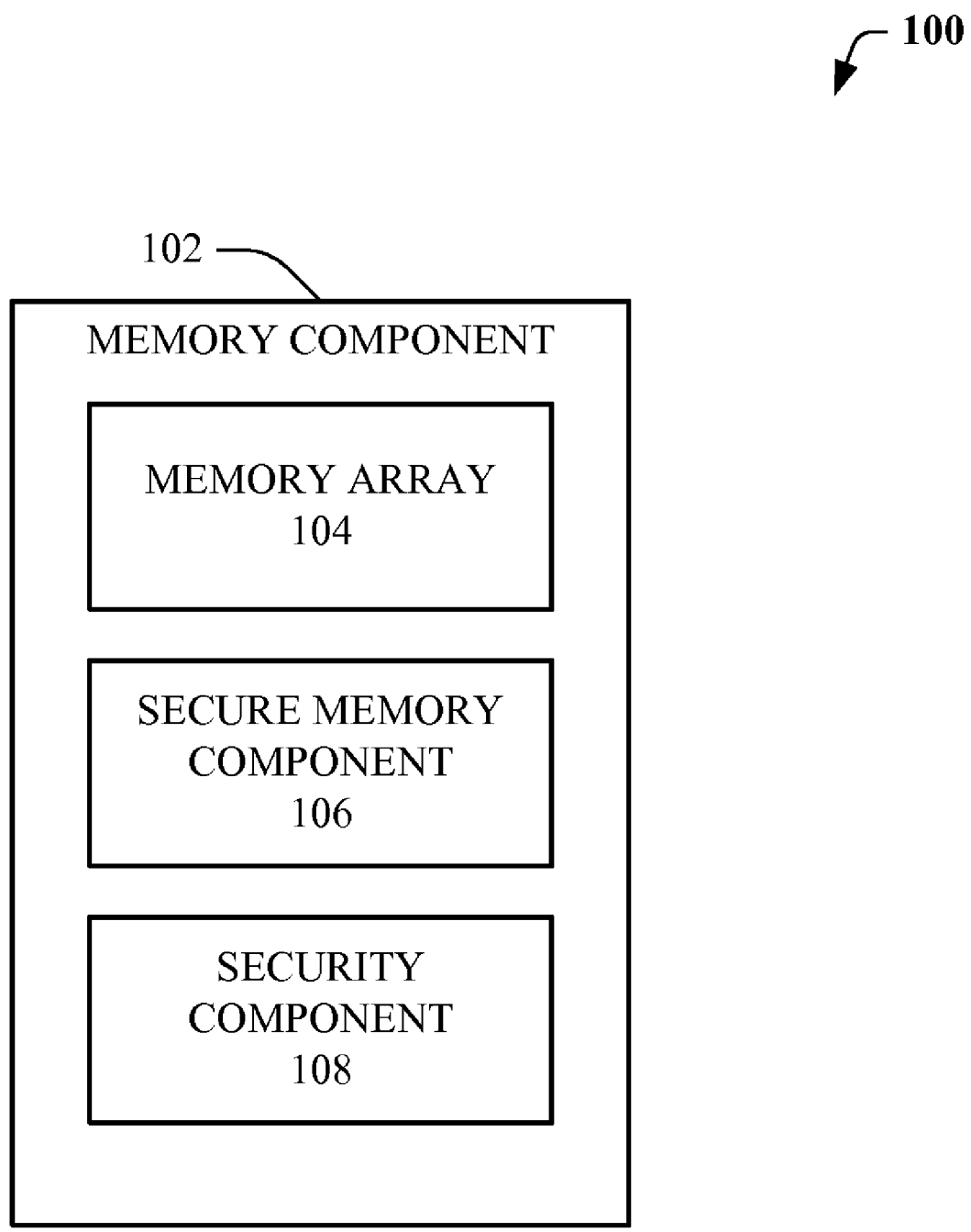
FIG. 1 illustrates a system that can efficiently erase data in a secure memory to facilitate data security associated with a memory component in accordance with an aspect of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Many electronic devices, such as cellular phones, computers, and personal digital assistants (PDA) utilize memory (e.g., flash memory) to store information. Information, such as sensitive and/or personal information of users, is often stored in the memory of such devices, and it is desirable to protect such information from attack or discovery by unauthorized entities. Secure processes, such as data encryption and decryption, can be performed to facilitate securing data associated with the memory, where secure processes and/or secure computations associated therewith can be performed. Information related to these secure processes, secure functions, and/or secure computations can be stored in a secure memory when such processes, functions, and/or computations are performed and can also remain in the secure memory thereafter. It is desirable to protect information contained in the secure memory from attack or unauthorized disclosure to facilitate securing the memory associated therewith and data (e.g., sensitive or personal information) associated with the memory from attack or unauthorized disclosure.

Systems, methods, and/or devices that can facilitate erasing or resetting a secure memory component (e.g., volatile memory), or desired portion thereof, associated with a memory component are presented. A memory component can include a security component that can facilitate efficiently erasing or resetting to a predefined value all or a desired subset of storage locations in a secure memory component in a single clock cycle based in part on predetermined reset criteria to facilitate securing data associated with the memory component. For example, the security component can employ a sensor(s) that can detect a security breach and in response to the security breach can transmit a reset signal to the secure memory component to facilitate automatically erasing or resetting to a predefined value all or a desired subset of storage locations in the secure memory component to remove content (e.g., secure content, such as content related to secure processes, secure functions, and/or secure computations) to facilitate securing data associated with the memory component. As another example, at a desired time (e.g., after cryptographic computations have been completed), the security component can transmit a reset signal to facilitate erasing or resetting to a predefined value all or a desired subset of storage locations in the secure memory component to remove content, such as secure content, from the secure memory component to facilitate securing data associated with the memory component.

The subject innovation also can facilitate efficiently generating pseudo-random numbers. In one aspect, a reset or an erase of all or a portion of storage locations in the secure memory component can be performed. The secure memory component can employ a scrambler component (e.g., scrambling mechanism) that can utilize scrambler keys to scramble and descramble data. When the reset or erase is performed, as desired, a scrambler key can be changed to a new scrambler key. The sets of data can be read from the respective storage locations and descrambled using the new scrambler key. The descrambled sets of data can be provided to a random number generator component, which can utilize the descrambled sets of data as one or more pseudo-random numbers, or can further process the descrambled sets of data to generate one or more pseudo-random numbers. New pseudo-random numbers can be generated each time a scrambler key is changed after a reset or an erase is performed in the secure memory component. The number of pseudo-random numbers generated can be based in part on the input value, scrambler key, and/or respective memory address of the storage location where the input value is stored.

FIG. 1 illustrates a system 100 that can efficiently erase data in a secure memory to facilitate data security associated with a memory component in accordance with an aspect of the disclosed subject matter. System 100 can include a memory component 102 that can be utilized to securely store and provide data. The memory component 102 can include a memory array 104, which can be a nonvolatile memory that can be comprised of a plurality of memory locations (e.g., memory cells) wherein, for each memory location, one or more bits of data can be stored. The memory array 104 can comprise nonvolatile memory, such as, for example, flash memory (e.g., single-bit flash memory, multi-bit flash memory), read only memory (ROM), programmable ROM (PROM), electrically programmable ROM (EPROM), electrically erasable programmable ROM (EEPROM), and/or nonvolatile random access memory (NVRAM) (e.g., Ferroelectric random access memory (FeRAM)), and the like. Further, a flash memory can be comprised of NOR flash memory and/or NAND flash memory.

In accordance with an aspect, the memory component 102 can also include a secure memory component 106 that can be associated with the memory array 104 and can be utilized to facilitate securing data associated with the memory component 102. The secure memory component 106 can comprise volatile memory (e.g., random access memory (RAM), static RAM (SRAM)) that can include a plurality of storage locations (e.g., memory cells) in which data can be stored (e.g., data can be written to storage locations) and from which data can be retrieved (e.g., read). The secure memory component 106 can be structured to have a desired number of blocks that can each contain a subset of storage locations. The secure memory component 106 can be utilized to store sensitive and/or secret information, such as, for example, keys (e.g., secret keys), algorithms related to data security (e.g., cryptographic algorithm(s)), secure computation results (e.g., cryptographic computation results), and/or other information that can be utilized to facilitate securing data associated with the memory component 102. For example, in accordance with a cryptographic protocol, cryptographic computations can be performed on data being read from the memory array 104 to facilitate decrypting the data. The cryptographic key can be stored (e.g., temporarily stored) in the secure memory component 106 where the cryptographic key can be used to facilitate decrypting the read data. Also, cryptographic computations results (e.g., intermediate cryptographic computation results) associated with decryption of the read data can be stored in the secure memory component 106 and such results can be retrieved from the secure memory component 106 so that other cryptographic computations or processes can be performed using the results to facilitate decrypting data read from the memory array 104.

The volatile memory can include, but is not limited to, RAM, SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Conventionally, when a secure memory is employed in a memory device to be utilized in relation to secure processes (e.g., cryptographic processes, authentication processes, etc.), and secure functions and secure computations associated therewith, a central processing unit (CPU) typically erases the secure memory one word at a time or one byte at a time for each clock cycle, and as a result, it can take a relatively large number of clock cycles to erase the secure memory. If a hacker or other unauthorized entity breaches the security of the memory and/or secure memory, before the secure memory is erased by the CPU, the unauthorized entity can have an opportunity to gain unauthorized access to the memory and data (e.g., sensitive information of the user) associated therewith, and/or sensitive and/or secret information related to the secure processes, which can enable the unauthorized entity to gain unauthorized access to the memory and data associated therewith.

Another conventional technique to erasing a secure memory is to power down and power up the secure memory, which can erase content stored in the secure memory (e.g., volatile memory) due to the power loss. However, powering down and powering up a secure memory (or electronic device associated therewith) can be very time consuming and inconvenient. It is desirable to efficiently and quickly erase or reset a secure memory to minimize the risk of attack on and disclosure of data associated with the memory and secure memory, while also performing the erase or reset in a time-efficient manner.

In accordance with an aspect, the secure memory component 106 can be associated (e.g., electrically connected) with a security component 108 that can be utilized to facilitate securing data associated with the memory component 102. The security component 108 can be utilized to facilitate efficiently erasing (e.g., parallel erasing) or resetting (e.g., parallel resetting) to a predefined value all or a select subset of storage locations in the secure memory component 106 in a single clock cycle, as desired, based in part on predetermined reset criteria. In one aspect, the security component 108 can facilitate erasing or resetting desired storage locations in the secure memory component 108 in response to a detected security breach associated with the memory component 102. The security component 108 can sense and/or detect a security breach or tamper event associated with the memory component 102 based in part on the predetermined reset criteria.

Figure 2:
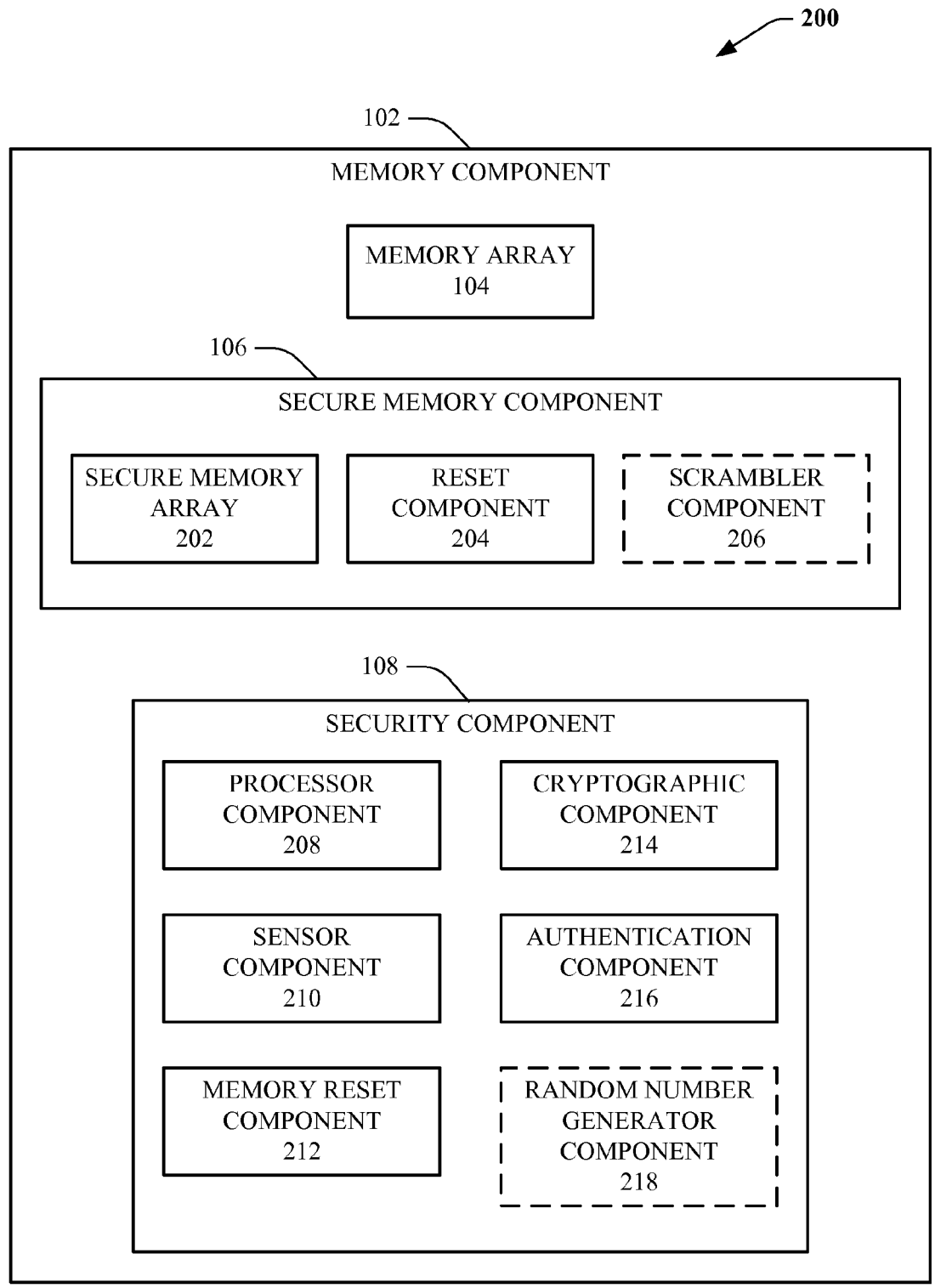
FIG. 2 illustrates a system that can facilitate efficiently erasing or resetting a secure memory component to facilitate securing data associated with a memory component in accordance with an aspect of the disclosed subject matter.

The predetermined reset criteria can relate to, for example, type of memory; expected value or range of values of security-related attributes (e.g., expected value of range of values for temperature level associated with the memory component 102, expected value of range of values for voltage level associated with the memory component 102, etc.); type of security breach (e.g., attempt to break open or gain unauthorized access to the memory component 102, such as by breaking open the casing of the memory component 102 or an electronic device in which the memory component 102 resides; breach related to a variance in a resistance level, such as a short circuit, associated with a shield, such as a metal shield, in the memory component 102; breach related to failed authentication attempts to access the memory component 102; breach related to temperature level associated with memory component 102, such as a temperature level for a particular component in memory component 102 being outside of an expected range of temperature levels; breach related to a voltage level associated with memory component 102, such as voltage level for a particular component in memory component 102 being outside of an expected range of voltage levels; breach related to an attack using radio frequency (RF) energy to introduce a fault in a cryptographic component (e.g., cryptographic component 214 as depicted in FIG. 2 and described herein) in the memory component 102; breach related to an attack that introduces a voltage glitch, which can be a voltage variance over a very short period of time, to produce a fault in the cryptographic component; breach related to an attack using power transients to introduce a fault in the cryptographic component; breach related to an attack using clock transients to introduce a fault in the cryptographic component; breach related to an attack that bombards the cryptographic component with heavy ions to introduce a fault in the cryptographic component; breach related to an attack using pressure variations to introduce a fault in the cryptographic component; breach related to an attack using ultraviolet (UV) light to introduce a fault in the cryptographic component; breach related to an attack using a laser to introduce a fault in the cryptographic component; breach related to an attack using white light to introduce a fault in the cryptographic component; etc.); level of severity of the security breach (e.g., a response to a low-level security breach can be to erase or reset a particular subset of storage locations in the secure memory component 106; a response to a high-level security breach can be to erase or reset all storage locations in the secure memory component 106); performance or completion of secure processes, secure functions, and/or secure computations; etc.

For example, the security component 108 can monitor activity associated with the memory component 102, and can monitor, sense, and/or measure the temperature of the memory component 102, or portions (e.g., components) thereof, voltage level(s) associated with the memory component 102, and/or other security-related attributes (e.g., integrity of the casing of the memory component 102 or electronic device associated therewith, authentication associated with the memory component 102, etc.) to detect whether the temperature level, voltage level, and/or other parameters associated with a security-related attribute(s) are being manipulated or compromised in order to gain unauthorized access to data stored in the memory component 102 and/or learn information in an attempt to access the memory component 102 and discover data stored therein. The security component 108 can facilitate determining whether an erase or a reset of all or a portion of the secure memory component 106 is to be performed in response to the detected security breach or tamper event.

If the security component 108 determines that an erase or a reset of all or a portion of the secure memory component 106 is to be performed in response to the detected security breach or tamper event, the security component 108 can transmit a reset signal or can write to a dedicated register (not shown) to indicate to the secure memory component 106 that all or a select subset of storage locations in the secure memory component 106 are to be erased or reset. For instance, the secure memory component 106 can receive the reset signal and the reset signal can be provided to a reset pin(s) associated (e.g., electrically connected) with all or a select subset of storage locations at the same time or substantially the same time (e.g., in parallel), so that these storage locations can be erased or reset during a single clock cycle (e.g., the next clock cycle). Efficiently (e.g., instantaneously) erasing or resetting these storage locations in a single clock cycle can facilitate securing the memory component 102, including the secure memory component 106, from unauthorized access or unauthorized disclosure of data.

In another aspect, the security component 108 can facilitate instantaneously erasing or resetting to a predefined value desired storage locations in the secure memory component 108 after cryptographic computations related to an operation (e.g., read, write) associated with the memory component 102 are completed, in accordance with predetermined reset criteria. The security component 108 can monitor execution of operations and secure processes (e.g., cryptographic processes, authentication processes, etc.), including secure functions and secure computations associated therewith, in the memory component 102 and can receive information indicating that secure processes, secure functions, and/or secure computations associated with the memory component 102 are completed. Secret information, such as secure computation results, key information (e.g., secret key), and/or other information associated with the secure processes, functions, and/or computations can be stored in storage locations in the secure memory component 106. It can be desirable to erase or reset the storage locations after the secure processes, functions, and/or computations are completed as information stored in these storage locations is no longer needed by the memory component 102 and there is a risk of unauthorized access or disclosure of this secret information, which can be utilized by an unauthorized entity to learn or discover data (e.g., sensitive and/or personal information) associated with the memory component 102 and associated user.

To erase or reset these storage locations, after the secure process(es), secure function(s), and/or secure computation(s) are completed, the security component 108 can transmit a reset signal or can write to a dedicated register (not shown) to indicate to the secure memory component 106 that these storage locations (e.g., all or a select subset of storage locations) in the secure memory component 106 are to be erased or reset. The secure memory component 106 can receive the reset signal, and the reset signal can be provided to a reset pin(s) associated (e.g., electrically connected) with these storage locations at the same time or substantially the same time (e.g., in parallel), so that these storage locations can be erased or reset during a single clock cycle (e.g., the next clock cycle) to facilitate securing the memory component 102 and data associated therewith.

In accordance with one embodiment, the security component 108 can generate random numbers, such as pseudo-random numbers, which can be utilized, for example, to facilitate securing data associated with the memory component 102. In one aspect, the secure memory component 106 can utilize scrambler keys to facilitate scrambling data written to storage locations and descrambling data read from storage locations in the secure memory component 106. After a reset is performed on all or a subset of storage locations in the secure memory component 106, the scrambler key can be changed. The data value of one or more of the reset storage locations can be read and descrambled by the secure memory component 106 using the new scrambler key, which can produce an output that can have an unknown or virtually unknown data value(s). The security component 108 can utilize the descrambled data as a pseudo-random number(s) or can further process the descrambled data to generate a pseudo-random number(s).

For example, the security component 108 can facilitate performing a reset of a subset of storage locations in the secure memory component 106, where each of the subset of storage locations can be reset or erased to a predefined value (e.g., 0). The scrambler key can be changed to a new scrambler key, and when data (e.g., having a predefined data value, such as 0) stored in the respective storage locations of the subset is descrambled and read from those storage locations using the new scrambler key, one or more pseudo-random numbers can be generated based in part on the read and descrambled data, as descrambled using the new scrambler key (e.g., as a function of the new descrambler key). The descrambled data can be a pseudo-random number(s), and/or used to create a pseudo-random number(s) (e.g., further processed to generate pseudo-random numbers), since the read data will be descrambled to a different physical value from its original value (e.g., 0), and the descrambled data value with be unknown or virtually unknown.

If the descrambling is based on the scrambler key and the input value, one pseudo-random number can be generated each time the scrambler key is changed. If the descrambling is based on the respective memory addresses of the respective storage locations of the subset in the secure memory component 106, and the scrambler key and input values, a different pseudo-random number can be generated with regard to each of those storage locations, which can result in a specified number of pseudo-random numbers being generated based in part on the number of storage locations from which the data is read and descrambled, each time the scrambler key is changed after a reset is performed. As a result, one or more pseudo-random numbers can be generated quickly and efficiently.

In accordance with another aspect, as desired, one or more pseudo-random numbers can be generated by scrambling data written to storage locations in the secure memory component 106 using a first scrambler key, changing the scrambler key, and reading the data from those storage locations, and descrambling the read data using the new scrambler key. For instance, the secure memory component 106 can employ a first scrambler key to scramble data (e.g., sets of data that each can have a predefined data value, such as 0) that can be written simultaneously to a subset of storage locations (e.g., several storage locations) in the secure memory component 106. The scrambler key can be changed to a disparate scrambler key, as desired, and the secure memory component 106 can read and descramble the sets of data (e.g., which were scrambled using the first scrambler key) using the new scrambler key, which can result in the sets of data having unknown or virtually unknown values, since the new scrambler key will descramble the sets of data to different values (e.g., value that is not the predetermined value) from the data that was originally written to the storage locations.

Conventionally, to generate random numbers, techniques employed include combining ring oscillators and/or using a random seed to feed a cryptographic hash function, block cipher, or linear feedback register. However, the conventional techniques for generating random number can be inefficient with regard to time and/or resources utilized to generate the random numbers. The subject innovation can efficiently generate random numbers by changing to a new scrambler key and reading sets of data from specified storage locations in the secure memory component 106 and descrambling the sets of data (e.g., which can be data having a predefined value after a reset) using the new scrambler key, where the descrambled sets of data can be pseudo-random numbers, or, as desired, can be further processed to generate pseudo-random numbers.

Referring to FIG. 2, depicted is a system 200 that can facilitate efficiently erasing or resetting a secure memory component to facilitate securing data associated with a memory component in accordance with an aspect of the disclosed subject matter. System 200 can include a memory component 102, which can include a memory array 104 (e.g., non-volatile memory array) that can store data in respective memory locations within the memory array 104. The memory component 102 can further include a secure memory component 106 that can be utilized to store sensitive or secret information, such as information related to secure processes (e.g., cryptographic process, authentication process, etc.), secure functions (e.g., data encryption, data decryption, authentication of a user, grant or denial of memory access rights, etc.), and/or secure computations (e.g., cryptographic computations). The memory component 102 also can include a security component 108 that can facilitate instantaneously erasing or resetting to a predefined value storage locations in the secure memory component 106 in a single clock cycle based in part on predetermined reset criteria and/or generating pseudo-random numbers. The memory component 102, memory array 104, secure memory component 106, and security component 108 can each be the same or similar as, and/or can include the same or similar functionality as, respective components, such as more fully described herein, for example, with regard to system 100.

In one aspect, the secure memory component 106 can comprise a secure memory array 202 that can include a plurality of blocks wherein each block there can be a subset of storage locations that can be utilized to store data, such as sensitive or secret information (e.g., cryptographic computations results, cryptographic keys, scrambler keys, cryptographic algorithms, etc.). The secure memory array 202 can be structured in a typical array form, where the storage locations are formed in an array, or the storage locations can be formed in the secure memory array 202 in virtually any desired manner that can facilitate storing data.

In another aspect, the secure memory component 106 can comprise a reset component 204 that can be utilized to facilitate instantaneously erasing or resetting to a predefined data value (e.g., 0, FFFF, . . . ) all or a desired subset of storage locations (e.g., storage locations in a block(s) in the secure memory array 202) in the secure memory array 202 in a single clock cycle. For instance, the reset component 202 can comprise one or more reset pins (not shown) that can be electrically connected to each of the storage locations. The reset component 202 can receive a reset signal from the security component 108 that indicates all or a select portion of the storage locations are to be erased or reset. The reset signal can be provided to each pin at the same or substantially the same time such that the reset signal can be provided to each storage location to be erased or reset in parallel to facilitate erasing or resetting each storage location in a single clock cycle.

In accordance with one embodiment, the secure memory component 106 optionally can contain a scrambler component 206 that can comprise a scrambling mechanism that can be utilized to facilitate scrambling data values being written to storage locations in the secure memory array 202 and/or descrambling data values being read from storage locations in the secure memory array 202 based in part on a scrambler key. For example, data having a value of 0 can be written to a storage location in the secure memory array 202. The data can be scrambled using the scrambler key such that the data value can be a different value than 0 when stored. When the scrambled data is read from the storage location, the data can be descrambled using that scrambler key such that the original data value of 0 can be obtained. The scrambler key can be changed, as desired.

In accordance with another aspect, the scrambler component 206 can be utilized to facilitate generating pseudo-random numbers. For instance, the security component 108 can facilitate performing a reset (e.g., in a single clock cycle) to reset or erase to a predefined value all or a subset of storage locations in the secure memory array 202. The scrambler key can be changed, and the predefined data value(s) for one or more of the reset storage locations can be read and can be descrambled using the new scrambler key (e.g., scrambler key that is different from the first scrambler key). The data value(s) of the descrambled data can have an unknown value or virtually unknown value, where the data value(s) can be based in part on the scrambling function associated with the new scrambler key. As a result, one or more pseudo-random numbers can be generated based in part on this descrambled data, such as more fully described herein.

In accordance with an aspect, the security component 108 can include a processor component 208 that can be a processor, controller, and/or microcontroller that can be utilized to facilitate erasing or resetting storage locations in the secure memory component 106. The processor component 208 can generate commands (e.g., reset commands), execute commands, and control the flow of information to or from the secure memory component 106. It is to be appreciated and understood that the processor component 208 can be included within the security component 108 (as depicted), can be a stand-alone unit, can be within another component, or any suitable combination thereof.

In another aspect, the security component 108 can contain a sensor component 210 that can sense, detect, and monitor activity associated with the memory component 102. The sensor component 210 can comprise one or more sensors (e.g., analog sensors) that can monitor, sense, and/or measure respective security-related attributes, such as temperature(s), voltage level(s), integrity of a casing (e.g., casing of memory component 102, casing of an electronic device associated with the memory component 102, etc.), entity authentication, and/or other security-related attributes, associated with the memory component 102. Hackers or other entities may try to tamper with the memory component 102 to learn sensitive or personal information associated with the user of the memory component 102. Hackers or other entities can attempt to manipulate or compromise the memory component 102 by controlling the temperature, voltage level, or other security-related attributes associated with the memory component 102 in order to access the memory component 102 (and/or secure memory component 106) and data therein or learn information that can be utilized to access the memory component 102 and data therein.

In accordance with one aspect, the sensor component 210 can transmit sensed information to a memory reset component 212 in the security component 108 that, in conjunction with the processor component 208, can evaluate the sensed information and can determine whether a security breach is detected based in part on predetermined reset criteria. If the memory reset component 212 determines that a security breach has occurred, the memory reset component 212 can transmit a reset signal to the reset component 204 to facilitate erasing or resetting to a predefined value all or a select subset of storage locations in the secure memory component 106. For instance, the memory reset component 212 and/or processor component 208, can evaluate sensed information to determine whether a sensed or measured value related to a security-related attribute is at a predetermined value (e.g., expected value) or within a predetermined range of values (e.g., an expected range of values), whether a sensor or switch has been triggered to switch to a different state (e.g., switch on a casing that can be triggered when the casing has been opened or disrupted, which can indicate a security breach has occurred), whether there has been a predetermined maximum number of failed attempts to authenticate in order to gain access to the memory component 102, or portion thereof, etc.

In accordance with one embodiment, the sensor component 210 can evaluate sensed information and can determine whether a security breach has occurred with regard to one or more sensors. The sensor component 210 can transmit (e.g., automatically transmit) a reset signal to the reset component 204 to facilitate erasing or resetting to a predefined value all or a select subset of storage locations if the sensor component 210 detects a security breach with regard to a sensor(s).

Referring again to the memory reset component 212, the memory reset component 212 also can facilitate erasing or resetting all or a select portion of the storage locations in the secure memory component 106 after secure processes, secure functions, and/or secure computations have been performed for a given operation (e.g., read, write, . . . ), in accordance with predetermined reset criteria. The memory reset component 212 can monitor the performance of secure processes, functions, and computations associated with the secure memory component 106. When the memory reset component 212 receives information from processor component 208 indicating, or otherwise determines, that the secure processes, functions, and/or computations for a given operation(s) have been completed, the memory reset component 212 in conjunction with the processor component 208 can facilitate transmitting a reset signal to the secure memory component 106 to facilitate erasing or resetting to a predefined value all or a desired (e.g., select) portion of the storage locations in the secure memory component 106 in a single clock cycle, in accordance with the predetermined reset criteria.

In still another aspect, the processor component 208 can be associated with a cryptographic component 214 that can facilitate encrypting and/or decrypting data to facilitate securing data being written to, stored in, and/or read from the memory component 102. The cryptographic component 214 can facilitate encrypting and/or decrypting data in accordance with a cryptographic protocol(s), as desired. In accordance with an aspect of the disclosed subject matter, the cryptographic component 214 can provide symmetric cryptographic tools and accelerators (e.g., Twofish, Blowfish, Advanced Encryption Standard (AES), Triple Data Encryption Standard (TDES), International Data Encryption Algorithm (IDEA), CAST5, RC4, etc.) to facilitate encrypting and/or decrypting data in order to facilitate securing data associated with the memory component 102. Cryptographic component 214 can also provide asymmetric cryptographic accelerators and tools (e.g., Rivest-Shamir-Adleman (RSA), Digital Signature Standard (DSS), and the like) to facilitate encrypting and/or decrypting data in order to facilitate securing data associated with the memory component 102. Additionally, cryptographic component 214 can provide accelerators and tools (e.g., Secure Hash Algorithm (SHA) and its variants such as, for example, SHA-0, SHA-1, SHA-224, SHA-256, SHA-384, and SHA-512) to facilitate encrypting and/or decrypting data in order to facilitate securing data associated the memory component 102.

In one aspect, cryptographic computation results (e.g., intermediate results, cryptographic algorithms, cryptographic keys, and/or other information associated with cryptographic processes performed by or in conjunction with the cryptographic component 214 can be stored (e.g., temporarily stored) in storage locations in the secure memory component 106 while a given operation(s) is being performed.

In yet another aspect, the processor component 208 can be associated with an authentication component 216 that can solicit authentication data (e.g., authentication credential) from an entity, and, based in part on the authentication data so solicited, can be employed, individually and/or in conjunction with information acquired and ascertained as a result of biometric modalities employed, to facilitate control access to the memory component 102 and data associated therewith. The authentication data can be in the form of a password (e.g., a sequence of humanly cognizable characters), a pass phrase (e.g., a sequence of alphanumeric characters that can be similar to a typical password but is typically of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by authentication component 216. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to facilitate encrypting and decrypting messages communicated between entities.

The authentication component 216 can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

The authentication component 216 also can interface and/or can be associated with an interface(s), such as a keypad, scanner, etc., that can receive authentication data, such as password, PIN, biometric information (e.g., information associated with fingerprints, eye features, facial features, voice recognition, etc.) associated with an entity. The authentication component 216 can evaluate (e.g., compare) received authentication data and stored valid authentication information (e.g., valid PIN to compare to a receive PIN, valid template for evaluating biometric data) to facilitate determining whether and/or what level of access rights can be granted to an entity with respect to the memory component 102. The valid authentication information can be stored in a secure region in the memory component 102.

In one aspect, authentication information (e.g., received authentication data, valid authentication information) associated with the authentication component 216 can be stored (e.g., temporarily stored) in storage locations in the secure memory component 106 during a given operation(s) or authentication procedure. In another aspect, other authentication-related information, such as key information, algorithms, etc. can be stored in storage locations in the secure memory component 106.

In accordance with an embodiment, the security component 108 optionally can include a random number generator component 218 that can be associated with the scrambler component 206 to facilitate generating pseudo-random numbers that can be utilized to facilitate securing data associated with the memory component 102. The random number generator component 218 can receive information associated with descrambled data from the scrambler component 206, where the descrambled can be data read from storage locations in the secure memory component 106 and descrambled by the descrambler component 206 based in part on a scrambler key. The random number generator component 218 can evaluate the received descrambled data, information related to the scrambler key(s) used to scramble and descramble the data read from the storage locations, memory address information respectively associated with storage locations, and/or other information to determine whether the received descrambled data is suitable for generating pseudo-random numbers based in part on predetermined random-number criteria.

For instance, the random number generator component 218 can receive descrambled data and scrambler key information, where a reset of the storage locations associated with the descrambled data has not been performed, and can determine that the received descrambled data is not suitable for use to generate pseudo-random numbers. As another example, the random number generator component 218 can receive descrambled sets of data respectively associated with a subset of storage locations of the secure memory component 106, memory addresses respectively associated with the subset of storage locations, scrambler key information, and information indicating that the scrambler key was changed after a reset of the subset of storage locations, and/or other information. Based in part on the predetermined random-number criteria, the random number generator component 218 can determine that pseudo-random numbers can be generated from such received descrambled data and that a pseudo-random number can be generated with respect to each storage location from which the descrambled data was read, wherein each pseudo-random number can be based in part on the value of the particular piece of data read from a memory address when it is descrambled and the respective memory address from which the respective piece of descrambled data was read.

In accordance with one embodiment of the disclosed subject matter, the memory component 102 including its constituent components (e.g., secure memory component 106, security component 108, cryptographic component 214, etc.) can be situated, formed, and/or implemented on a single integrated-circuit chip (e.g., single die, embedded chip), which can provide improved and/or increased data security of data programmed to, stored in, read from, and/or associated with the memory component 102. In accordance with another embodiment, the memory component 102, including its constituent components (e.g., secure memory component 106, security component 108, cryptographic component 214, etc.) can be formed and/or implemented on an application-specific integrated-circuit (ASIC) chip.

Figure 3A:
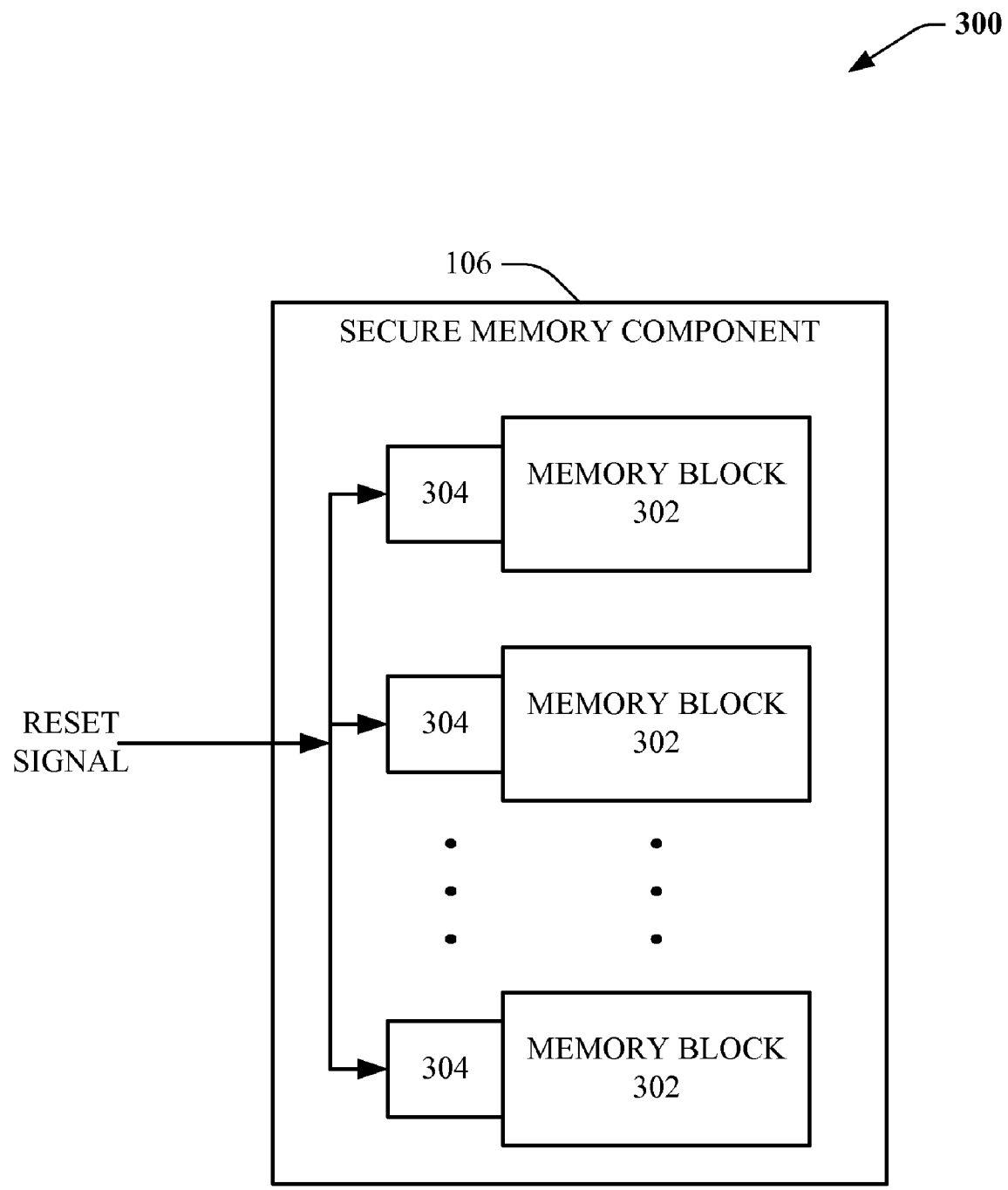
FIG. 3A depicts a system that can employ a reset signal to erase or reset blocks of storage locations in a secure memory component to facilitate securing data associated with a memory component in accordance with an aspect of the disclosed subject matter.

FIG. 3A illustrates a system 300 that can employ a reset signal to erase or reset blocks of storage locations in a secure memory component to facilitate securing data associated with a memory component in accordance with an aspect of the disclosed subject matter. System 300 can include a secure memory component 106 that can be utilized to store sensitive or secret information (e.g., cryptographic information) that can be utilized to facilitate securing data associated with the memory component 102. The secure memory component 106 can contain a reset component 204 that can be utilized to facilitate efficiently erasing or resetting storage locations in the secure memory component 106 in a single clock cycle based in part on predetermined reset criteria. It is to be appreciated and understood that the secure memory component 106 and reset component 204 each can include the same or similar functionality as respective components, such as more fully described herein, for example, with regard to system 100 and/or system 200.

In one aspect, the secure memory component 106 can comprise a plurality of memory blocks 302 that each can contain a subset of storage locations in which data, such as sensitive or secret information, can be stored. The reset component 204 can be associated (e.g., electrically connected) to each of the memory blocks 302. The reset component 204 can contain a plurality of block reset components 304 that can be respectively associated with the plurality of memory blocks 302. Each block reset component 304 can facilitate erasing or resetting storage locations contained in the memory block 302 associated therewith. When the secure memory component 106 receives a reset signal from the security component 108, the reset signal can be transmitted (e.g., propagated) to one or more of the block reset components 304 (e.g., selected block reset component(s) 304), as desired, to facilitate erasing or resetting the one or more memory blocks 302 respectively associated therewith. When a selected block reset component 304 receives the reset signal (e.g., from the security component 108), the selected block reset component 304 can erase or reset to a predefined value (e.g., 0, FFFF, . . . ) the storage locations in the associated memory block 302 in a single clock cycle.

Figure 3B:
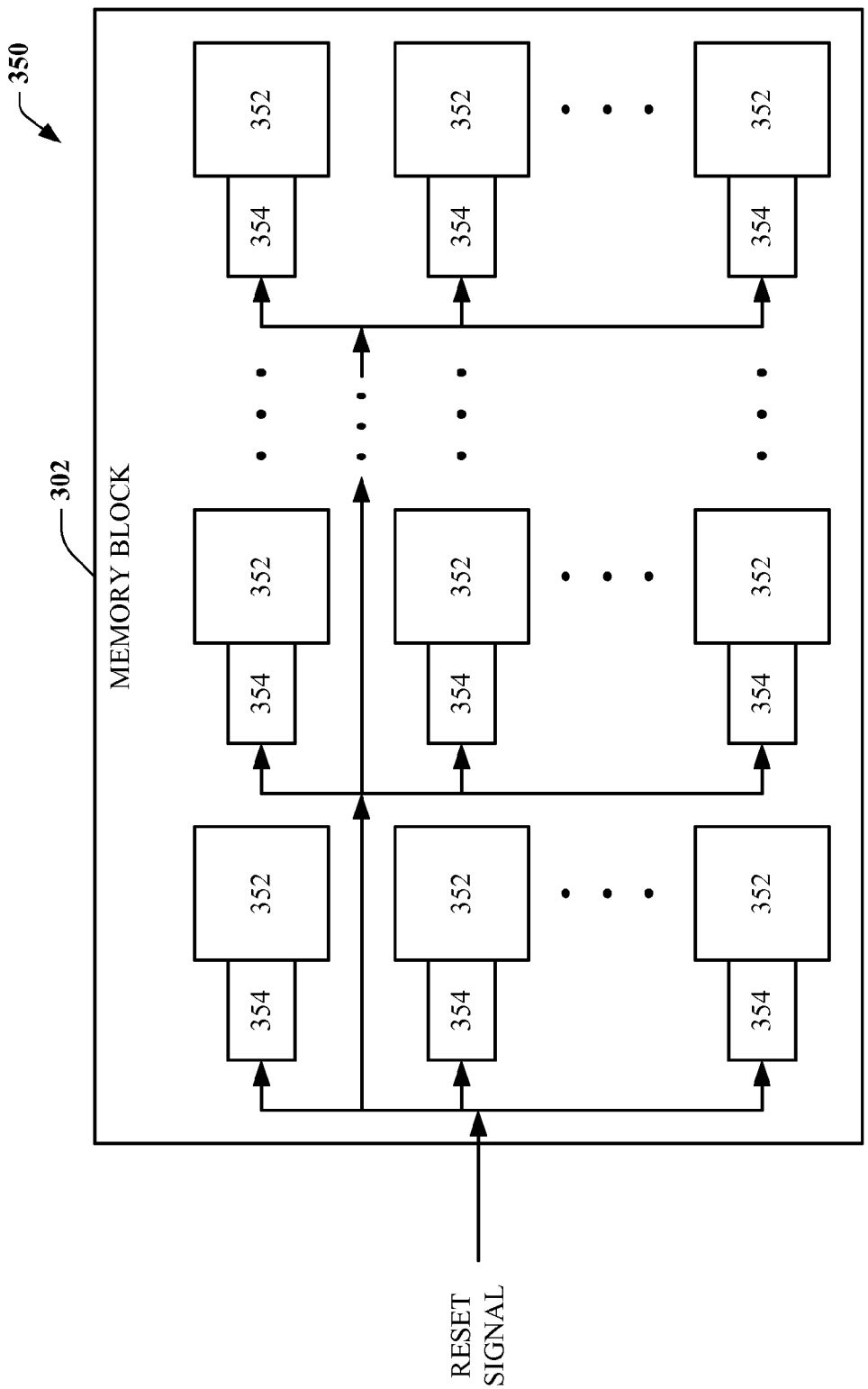
FIG. 3B depicts a system that can facilitate erasing or resetting storage locations in a memory block in a secure memory component to facilitate securing data associated with a memory component in accordance with an embodiment of the disclosed subject matter.

Referring to FIG. 3B, depicted is a system 350 that can facilitate erasing or resetting storage locations in a memory block in a secure memory component to facilitate securing data associated with a memory component in accordance with an embodiment of the disclosed subject matter. System 350 can comprise a memory block 302, which can be one of a plurality of memory blocks in a secure memory component 106. The memory block 302 can be associated with a block reset component 304 that can facilitate erasing or resetting the storage locations 352 in the memory block 302. It is to be appreciated that the memory block 302 and block reset component 304 each can include the same or similar functionality as respective components, such as more fully described herein, for example, with regard to system 100, system 200, and/or system 300.

In one aspect, the memory block 302 can comprise a plurality of storage locations 352 (e.g., a subset of storage locations associated with the memory component 102) in which data, such as sensitive or secret information, can be stored. The block reset component 304 can include a plurality of storage reset components 354 that can be respectively associated (e.g., electrically connected) to each of the storage locations 352 in the memory block 352. Each storage reset component 354 can facilitate erasing or resetting to a predefined value the storage location 352 associated therewith. When the block reset component 304 receives a reset signal, the reset signal can immediately be provided (e.g., transmitted, propagated) to each storage reset component 354 in the memory block 302, and, in a single clock cycle, the storage reset components 354 can erase or reset to a predefined value (e.g., 0s, Fs) the storage locations 352 respectively associated therewith in the memory block 302.

Figure 4:
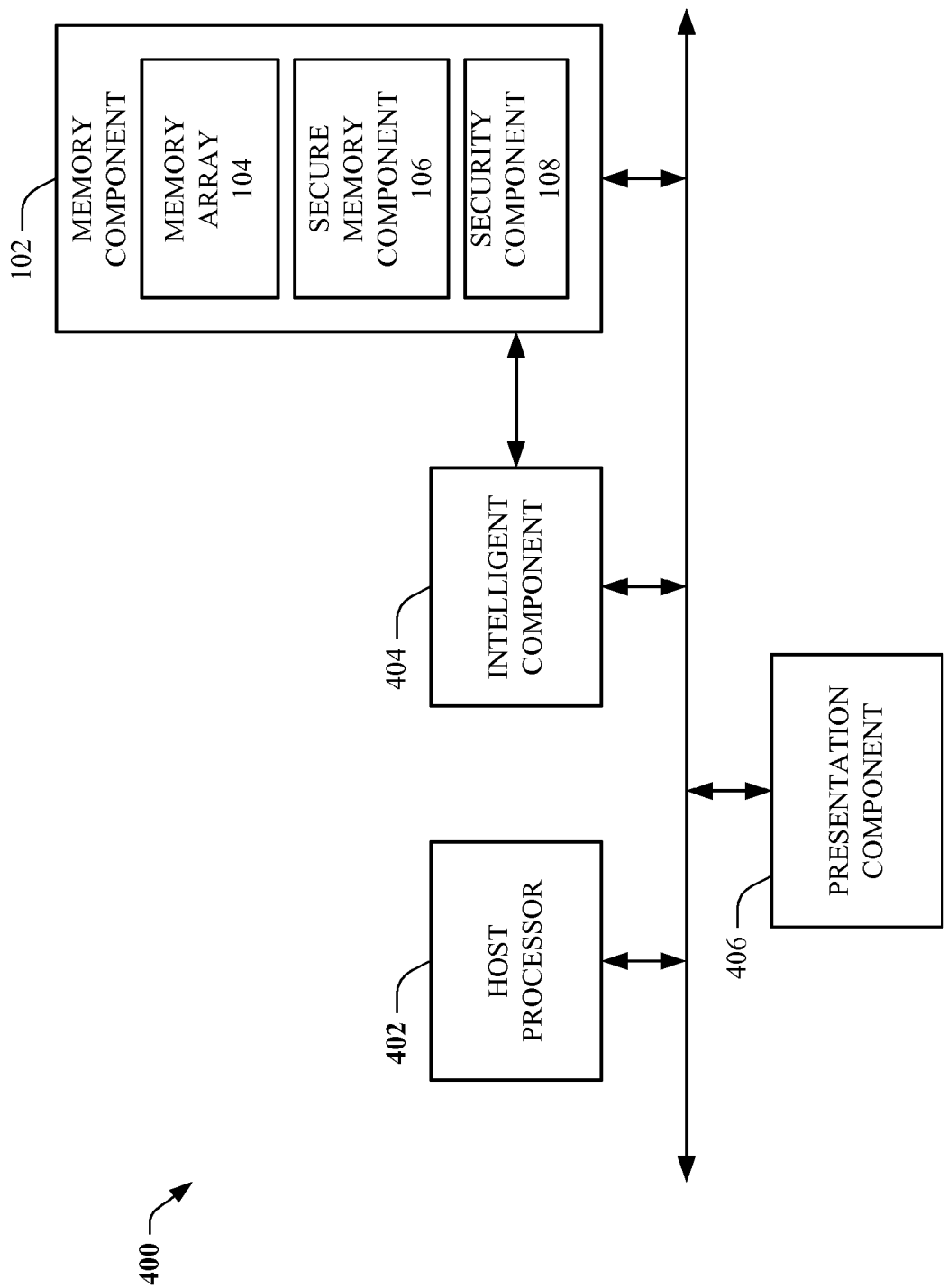
FIG. 4 illustrates a system that can employ intelligence to facilitate securing data associated with a memory component in accordance with an embodiment of the disclosed subject matter.

Turning to FIG. 4, illustrated is a system 400 that can employ intelligence to facilitate securing data associated with a memory component in accordance with an embodiment of the disclosed subject matter. System 400 can include a memory component 102, memory array 104, secure memory component 106, and security component 108. The memory component 102, memory array 104, secure memory component 106, and security component 108, each can be the same or similar as respective components such as described herein, for example, with regard to system 100, system 200, system 300, and/or system 350.

In one aspect, system 400 can include a host processor 402 that can be associated with the memory component 102 as well as other components associated with system 400. In accordance with an aspect of the disclosed subject matter, the host processor 402 can be a typical applications processor that can manage communications and run applications. For example, the host processor 402 can be a processor that can be utilized by a computer, a mobile handset, a PDA, or other electronic device, such as more fully described herein. The host processor 402 can generate commands, including read, write, and/or erase commands, in order to facilitate reading data from, writing data to, and/or erasing data from the memory component 102.

The system 400 can further include an intelligent component 404 that can be associated with the memory component 102, including the security component 108 and secure memory component 106, to facilitate analyzing data associated with the memory component 102 in order to facilitate making inferences and/or determinations regarding functions (e.g., erase or reset of storage locations in the secure memory component 106) that can be performed (e.g., automatically performed) by the memory component 102. The intelligent component 404 can receive information related to the memory component 102, and can analyze (e.g., evaluate) current and/or historical information related to the memory component 102, and, based in part on such analysis, the intelligent component 404 can render an inference(s) and/or a determination(s) regarding, for example, whether a security breach or tamper event has occurred, a type of security breach or tamper event, a type of response (e.g., automatically erase or reset a subset of storage locations 352 in the secure memory component 106) that can be employed or initiated with regard to a security breach or tamper event, whether a received descrambled data value can be a suitable pseudo-random number, etc.

For example, the security component 108 (e.g., via a sensor component 210) can detect a variance in a temperature level (or a particular voltage level) associated with the memory component 102. Information regarding the detected temperature variance (or voltage variance) can be provided to the intelligent component 404, and, based in part on current and/or historical evidence, the intelligent component 404 can infer whether the detected variance of the temperature level (or of the particular voltage level) is associated with a security breach or tamper event.

It is to be understood that the intelligent component 404 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . can be employed in connection with performing automatic and/or inferred action in connection with the disclosed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 400 also can include a presentation component 406 that can present data associated with the host processor 402. It is to be appreciated that the presentation component 406 can be incorporated into the host processor 402 and/or can be a stand-alone unit (as depicted). The presentation component 406 can provide various types of user interfaces to facilitate interaction between a user and any component coupled to the host processor 402.

The presentation component 406 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the host processor 402.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or an application programming interface (API). In addition, the command line interface can be employed in connection with hardware (e.g., video cards) and/or displays (e.g., black and white, and enhanced graphics adaptor (EGA)) with limited graphic support, and/or low bandwidth communication channels.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 5-9 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
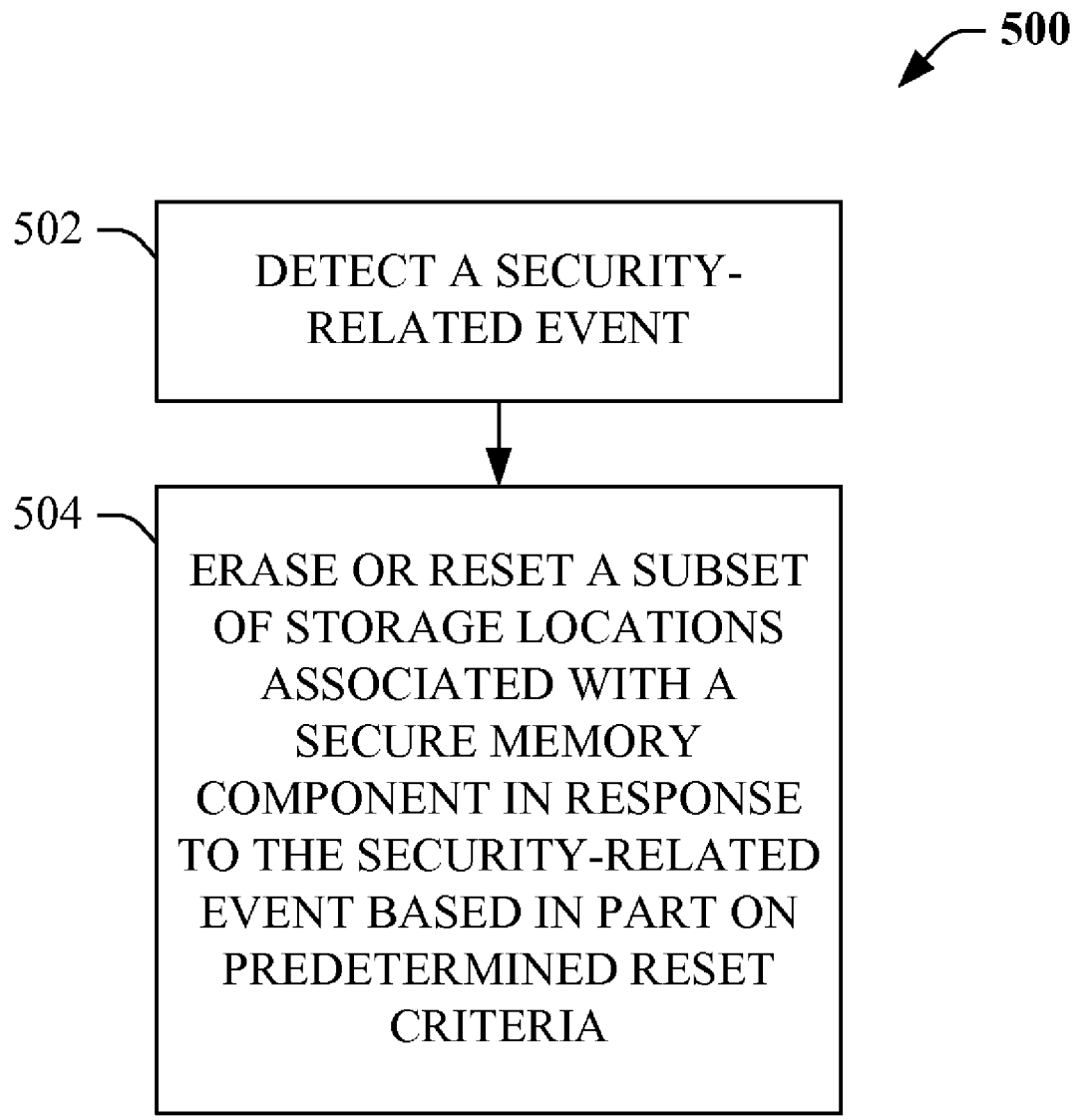
FIG. 5 illustrates a methodology that can facilitate erasing or resetting all or a desired portion of a secure memory component to facilitate securing data associated with a memory component in accordance with an aspect of the disclosed subject matter.

Referring to FIG. 5, illustrated is a methodology 500 that can facilitate erasing or resetting storage locations to facilitate securing data associated with a memory component in accordance with an aspect of the disclosed subject matter. At 502, a security-related event can be detected. In one aspect, a security component 108 can detect the occurrence of a security-related event, wherein the security-related event can be a security breach, or completion of a secure process(es), secure function(s) and/or secure computation(s), associated with the memory component 102, for example.

At 504, a subset of storage locations associated with a secure memory component can be erased or reset to a predefined value in response to the security-related event based in part on predetermined reset criteria. In one aspect, the security component 108 can receive information indicating that the security-related event occurred, and based in part on predetermined reset criteria, the security component 108 can transmit a reset signal to the secure memory component 106 to facilitate erasing or resetting to a predefined value a subset of storage locations 352 in the secure memory component 106 to remove content (e.g., sensitive or secret information) that was stored in those storage locations 352. The reset signal can be provided to each storage location 352 of the subset of storage locations 352 at the same or substantially the same time to facilitate erasing or resetting the storage locations 352 in parallel, where such erase or reset can be performed in a single clock cycle to efficiently remove the content from those storage locations 352. At this point, methodology 500 can end.

Figure 6:
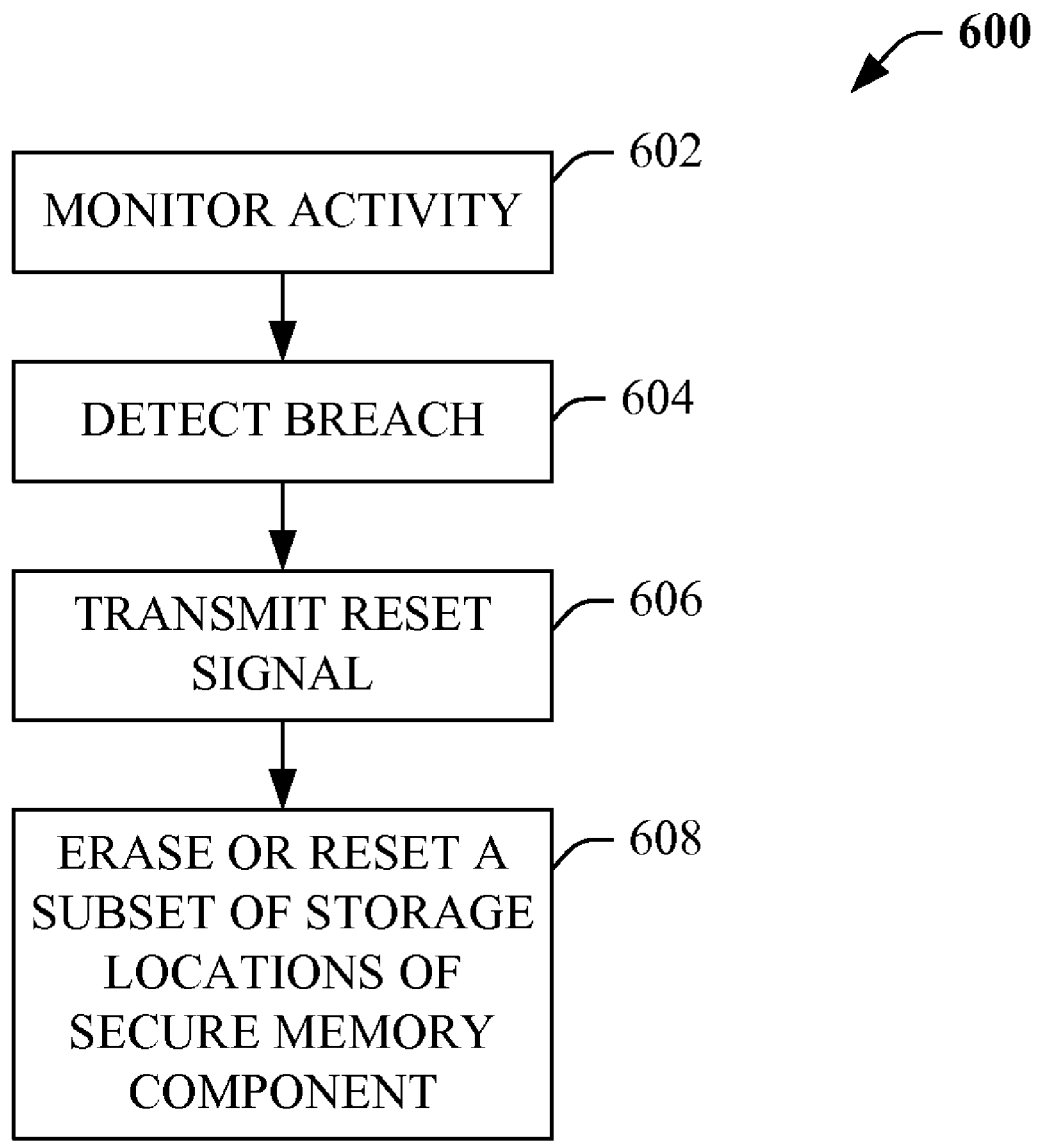
FIG. 6 illustrates a methodology that can facilitate erasing or resetting a secure memory component, or portion thereof, to facilitate securing data associated with a memory component in accordance with an aspect of the disclosed subject matter.

FIG. 6 depicts a methodology 600 that can facilitate erasing or resetting a secure memory component, or portion thereof, to facilitate securing data associated with a memory component in accordance with an aspect of the disclosed subject matter. At 602, activity associated with the memory component 102 can be monitored. The activity can relate to, for example, security-related attributes and/or events (e.g., tamper events, completion of secure processes, secure functions and/or secure computations, . . . ) associated with the memory component 102, which can be monitored. In one aspect, the memory component 102 can include a security component 108 that can facilitate securing data associated with the memory component 102. The security component 108 can employ a sensor component 210 that can comprise one or more sensors (e.g., analog sensors) that can monitor, sense, and/or measure values respectively associated with security-related attributes. The security-related attributes can include, for example, the temperature(s) and/or a voltage level(s) associated with the memory component 102, or a part(s) thereof, integrity of a casing associated with the memory component 102, authentication associated with the memory component 102, etc.

At 604, a security breach can be detected. In one aspect, the sensor component 210 can evaluate sensed information related to a security-related attribute(s) and can determine whether a security breach has occurred based in part on predetermined reset criteria. In accordance with an embodiment, the sensor component 210 can provide information (e.g., monitored information) related to a security-related attribute(s) to a memory reset component 212, which can evaluate such information to facilitate determining whether a security breach is detected based in part on predetermined reset criteria. For example, the monitored information associated with a security-related attribute, such as a temperature level, associated with the memory component 102 can be evaluated to determined whether the temperature level is outside of an expected temperature range for the particular operation(s) being performed based in part on the predetermined reset criteria. If it is determined that the temperature level is outside of the expected temperature level range, it can be determined that a security breach is detected.

At 606, a reset signal can be transmitted. In one aspect, upon determining that a security breach is detected, a reset signal can be transmitted (e.g., automatically transmitted) from the security component 108 to the secure memory component 106 to facilitate erasing or resetting to a predefined value all or a select subset of storage locations 352 in the secure memory component 106 in a single clock cycle. The reset signal can be transmitted by the sensor component 210, or the processor component 208, sensor component 210, and memory reset component 212 can operate in conjunction to determine whether a security breach is detected and to transmit a reset signal to the secure memory component 106. In accordance with another aspect, when the reset signal is received by the secure memory component 106, the reset signal can be provided to each selected storage location 352 in the secure memory component 106 to facilitate erasing or resetting the selected storage locations 352 instantaneously or substantially instantaneously (e.g., in a single clock cycle).

At 608, the secure memory component (e.g., 106), or a portion thereof, can be erased or reset to a predefined value. In one aspect, the reset signal can be provided to each selected storage location 352 (e.g., all or a select subset of storage locations 352) of the secure memory component 106 that is to be erased or reset. Based in part on the reset signal, each selected storage location 352 can be erased or reset to a predefined value in a single clock cycle. At this point, methodology 600 can end.

Figure 7:
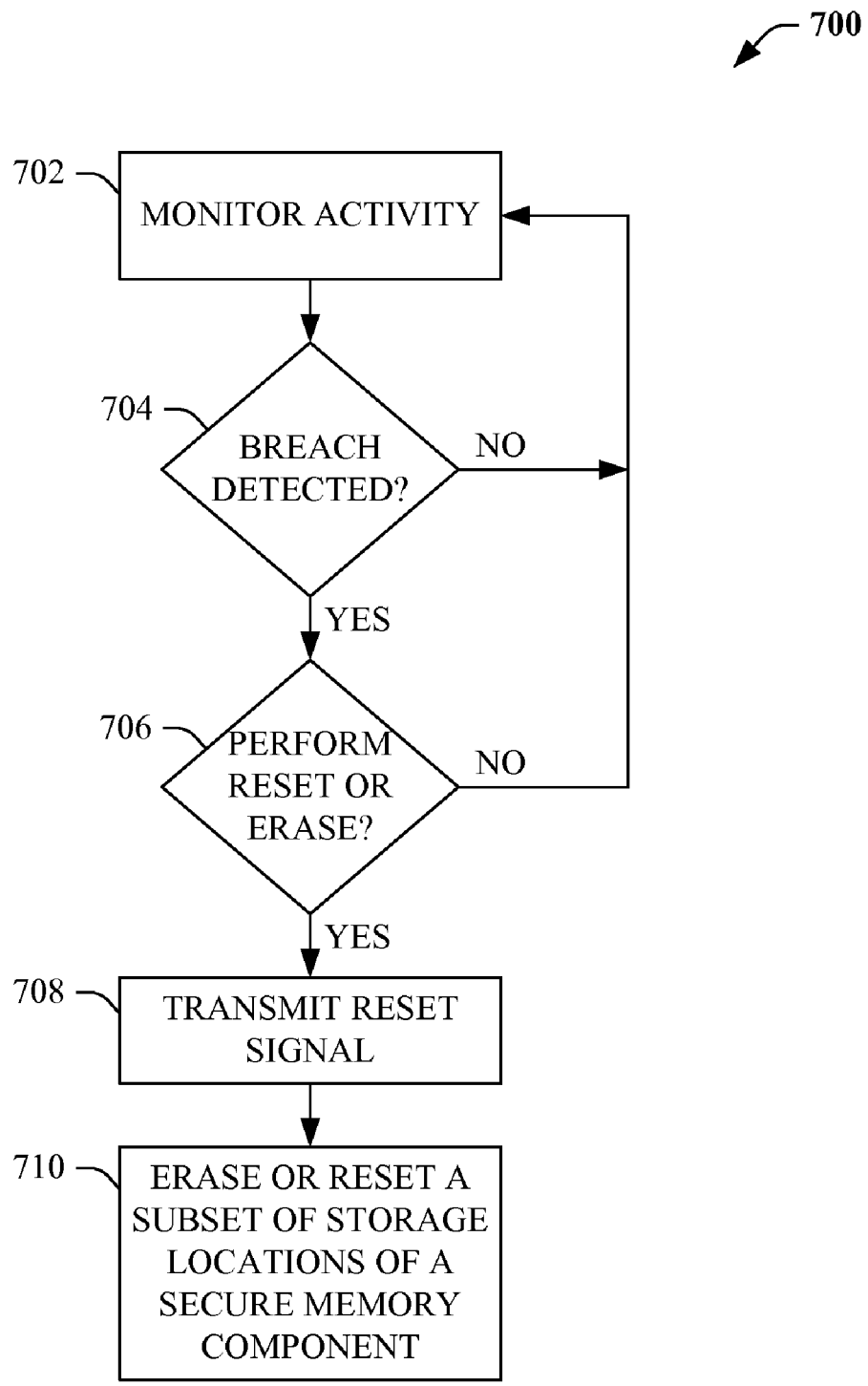
FIG. 7 depicts another methodology that can facilitate erasing or resetting a secure memory component, or a portion thereof, to facilitate securing data associated with a memory component in accordance with an aspect of the disclosed subject matter.

Turning to FIG. 7, depicted is another methodology 700 that can facilitate erasing or resetting a secure memory component, or a portion thereof, to facilitate securing data associated with a memory component in accordance with an aspect of the disclosed subject matter. At 702, activity associated with the memory component 102 can be monitored. Activity can relate to, for example, security-related attributes and/or events (e.g., tamper events, completion of secure processes, secure functions and/or secure computations, . . . ) associated with the memory component 102, which can be monitored. In one aspect, a memory component 102 can comprise a security component 108 that can facilitate erasing or resetting the secure memory component 106, or a portion thereof, to facilitate securing data associated with the memory component 102. The security component 108 can employ a sensor component 210 that can comprise one or more sensors (e.g., analog sensors) that can monitor, sense, measure, and/or evaluate values respectively associated with security-related attributes. The security-related attributes can include, for example, temperature level(s) and/or a voltage level(s) associated with the memory component 102, or a part(s) thereof, integrity of a casing associated with the memory component 102, authentication associated with the memory component 102, etc.

At 704, a determination can be made as to whether a security breach is detected. In one aspect, information related to the security-related attributes, including monitored information related to the security-related attributes, information related to a desired or an expected value or range of values for a security-related attribute(s), information related to a predetermined maximum number of authentication attempts and/or other information, associated with the memory component 102, can be evaluated to facilitate determining whether a security breach is detected based in part on predetermined reset criteria. The sensor component 210 can perform such evaluation, or the processor component 208, sensor component 210, and memory reset component 212 can operate in conjunction to perform such evaluation, and determine whether a security breach is detected. If it is determined that no security breach is detected, methodology 700 can return to reference numeral 702 to continue monitoring security-related attributes associated with the memory component 102 and can proceed from that point.

If, at 704, it is determined that a security breach is detected, at 706, a determination can be made regarding whether a reset or an erase is to be performed. In one aspect, the processor component 208, sensor component 210, and memory reset component 212 can work in conjunction to facilitate determining whether a reset or erase is to be performed in response to a security breach based in part on predetermined reset criteria. For example, it can be determined that a security breach has occurred. The information related to the security breach can be evaluated to determine whether the security breach is severe enough that an erase or a reset of the secure memory component 106, or a portion thereof, is to be performed based in part on the predetermined reset criteria. As another example, as desired, based in part on predetermined reset criteria, a given security breach can result in a reset signal automatically being transmitted from the security component 108 to the secure memory component 106 to facilitate erasing or resetting all or a select subset of storage locations in the secure memory component 106. If it is determined that an erase or a reset is not to be performed in response to the security breach, methodology 700 can return to reference numeral 702 to continue monitoring security-related attributes associated with the memory component 102 and can proceed from that point.

If, at 706, it is determined that a reset or an erase of at least a portion of the secure memory component 106 is to be performed, at 708, a reset signal can be transmitted. In one aspect, upon determining that an erase or a reset is to be performed in response to a detected security breach, a reset signal can be transmitted (e.g., automatically transmitted) from the security component 108 to the secure memory component 106 to facilitate erasing or resetting to a predefined value all or a select subset of storage locations 352 in the secure memory component 106 in a single clock cycle. In one embodiment, the processor component 208 and/or memory reset component 212 can operate in conjunction to transmit the reset signal to the secure memory component 106. In accordance with another aspect, when the reset signal is received by the secure memory component 106, the reset signal can be provided to each selected storage location 352 in the secure memory component 106 to facilitate erasing or resetting the selected storage locations 352 instantaneously or substantially instantaneously (e.g., in a single clock cycle).

At 710, all or a portion of the secure memory component 106 can be erased or reset to a predefined value. In one aspect, the reset signal can be provided to each storage location 352 (e.g., all or a select subset of storage locations 352) of the secure memory component 106 that is selected to be erased or reset. Based in part on the reset signal, in a single clock cycle, each selected storage location 352 can be erased or reset to a predefined value to remove the content (e.g., sensitive or secret information) that was stored therein. At this point, methodology 700 can end.

Figure 8:
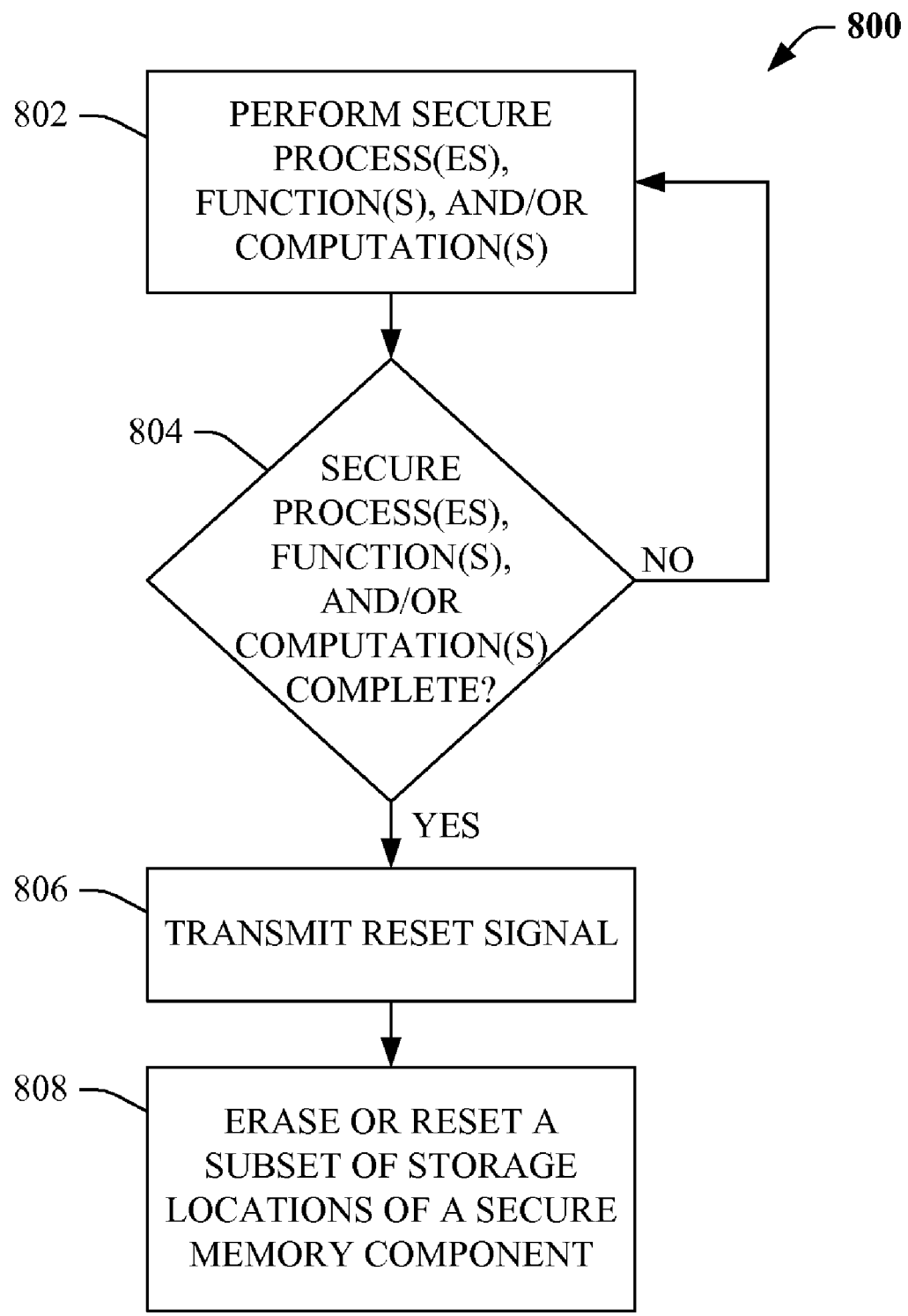
FIG. 8 depicts a methodology that can reset or erase all or a portion of a secure memory component to facilitate securing data associated with a memory component in accordance with an aspect of the disclosed subject matter.

Referring to FIG. 8, illustrated is a methodology 800 that can reset or erase all or a portion of a secure memory component to facilitate securing data associated with a memory component in accordance with an aspect of the disclosed subject matter. At 802, one or more secure processes, secure functions, and/or secure computations can be performed. For example, a cryptographic component 214 and/or processor component 208 can facilitate performing secure computations (e.g., cryptographic computations) associated with encrypting or decrypting data associated with the memory component 102. The security component 108 can monitor the performance of the secure computation(s) to facilitate determining the status of the secure computation(s) and/or the secure process (e.g., cryptographic process) associated therewith. Information related to the secure computation(s), such as intermediate cryptographic computation results, cryptographic keys, cryptographic algorithms, etc., can be stored in the secure memory component 106 while a secure computation(s) is being performed.

At 804, a determination can be made regarding whether the secure process(es), secure function(s), and/or secure computation(s) is complete. In one aspect, the security component 108 can receive information regarding a secure process(es), secure function(s), and/or secure computation(s) being performed. The security component 108 can determine whether there is another secure process, secure function, and/or secure computation to be performed with regard to a given operation(s) (e.g., read, write, . . . ). If it is determined that the secure process, secure function, and/or secure computation is not complete, methodology 800 can return to reference numeral 802, where one or more additional secure processes, secure functions, and/or secure computations can be performed, for example, with regard to a given operation(s) associated with the memory component 102.

If, at 804, it is determined that the secure process, secure function, and/or secure computation is complete, at 806, a reset signal can be transmitted. In one aspect, the security component 108 can receive information indicating that the secure process, secure function, and/or secure computation associated with a given operation(s) is complete. Based in part on predefined criteria (e.g., reset can be performed when secure computations associated with a secure function are complete), the security component 108 can determine that all or a select portion (e.g., select subset of storage locations) of the secure memory component 106 can be erased or reset to a predefined value. Upon determining that an erase or a reset is to be performed, a reset signal can be transmitted (e.g., automatically transmitted) from the security component 108 to the secure memory component 106 to facilitate erasing or resetting to a predefined value all or a select subset of storage locations 352 in the secure memory component 106, which can be performed in a single clock cycle. In one embodiment, the processor component 208 and/or memory reset component 212 can operate in conjunction to transmit the reset signal to the secure memory component 106. In accordance with another aspect, when the reset signal is received by the secure memory component 106, the reset signal can be provided to each selected storage location 352 in the secure memory component 106 to facilitate erasing or resetting the selected storage locations 352 instantaneously or substantially instantaneously (e.g., in a single clock cycle).

At 808, all or a portion of the secure memory component can be erased or reset to a predefined value. In one aspect, the reset signal can be provided to each storage location 352 (e.g., all or a select subset of storage locations 352) of the secure memory component 106 that is selected to be erased or reset. Based in part on the reset signal, in a single clock cycle, each selected storage location 352 can be erased or reset to a predefined value in a single clock cycle in order to remove data, such as sensitive or secret information that was stored in the selected storage locations 352. At this point, methodology 800 can end.

Figure 9:
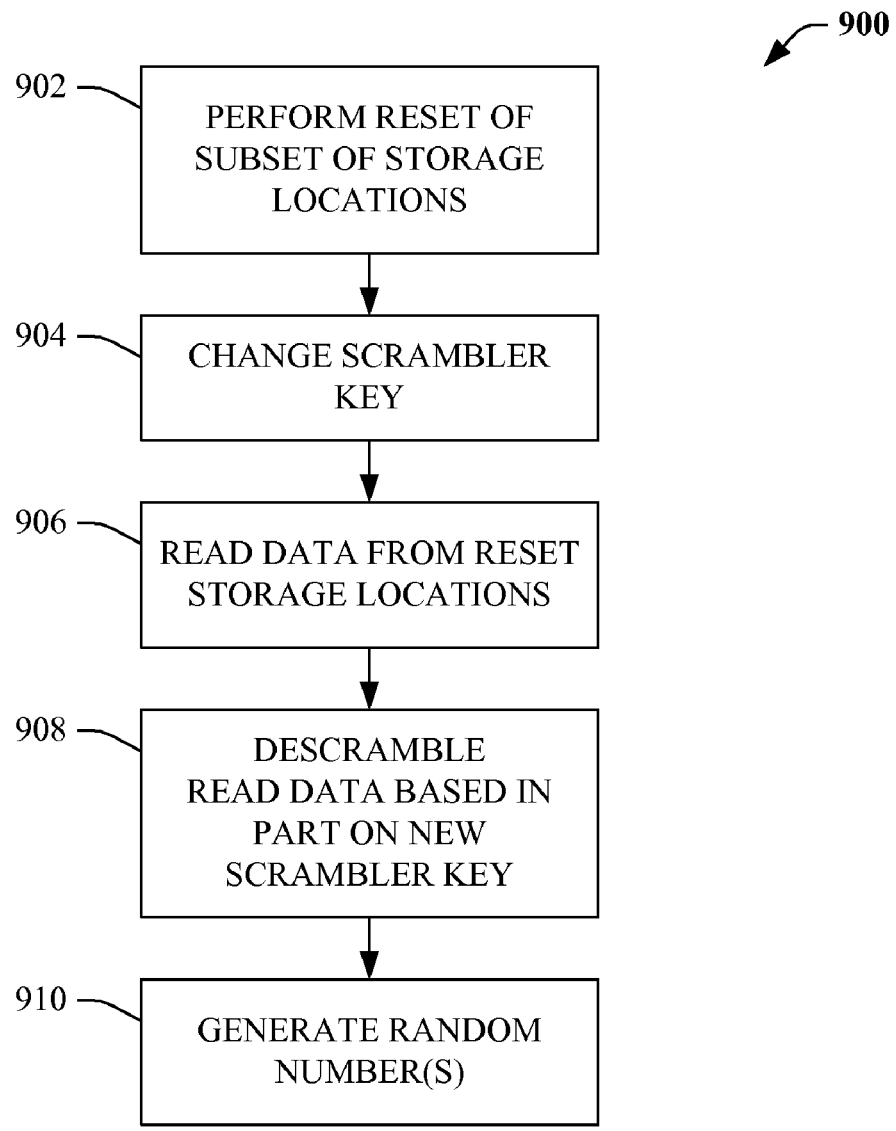
FIG. 9 illustrates a methodology that can facilitate generating random numbers to facilitate securing data associated with a memory component in accordance with an aspect of the disclosed subject matter.

Turning to FIG. 9, depicted is a methodology 900 that can facilitate generating random numbers (e.g., pseudo-random numbers) to facilitate securing data associated with a memory component in accordance with an aspect of the disclosed subject matter. At 902, a reset of a subset of storage locations 352 can be performed. In one aspect, the security component 108 can transmit a reset signal to the secure memory component 106 to facilitate resetting or erasing a subset of storage locations 352 to a predefined value based in part on a predetermined reset criteria (e.g., in response to a security-related event).

At 904, a scrambler key can be changed. In one aspect, a scrambler component 206 can be employed to scramble and descramble data being respectively written to and/or read from storage locations 352 in the secure memory component 106 based in part on a scrambler key having a unique scrambler function. As desired, after a reset, a first scrambler key can be changed to a new scrambler key. For example, the processor component 208 and/or cryptographic component 212 can facilitate changing the scrambler key. The scrambler key can be changed to facilitate generating one or more pseudo-random numbers, or can be changed for another desired reason, which can still facilitate generating one or more pseudo-random numbers.

At 906, data can be read from the reset storage locations 352. In one aspect, respective sets of data can be read from respective storage locations 352 of the subset that was reset, where each set of data can have a data value that can be a predefined data value (e.g., 0s, Fs) associated with a reset of the respective storage locations 352. The processor component 208 can facilitate reading the data from respective storage locations 352. At 908, the read data can be descrambled based in part on the new scrambler key. In one aspect, the scrambler component 206 can facilitate descrambling the respective sets of read data (e.g., a set(s) of data having a predefined data value after a reset) using the new scrambler key, which can be different from the first scrambler key. As the new scrambler key can have a unique scrambling function, the descrambled sets of data can have unknown (or virtually unknown) values.

At 910, one or more random numbers can be generated based in part on predetermined random-number criteria. In one aspect, a random number generator component 218 can receive the respective sets of data descrambled using the new scrambler key and/or other information, such as the respective memory addresses in which the respective sets of data were stored, and using the respective sets of descrambled data and/or the other information, can facilitate generating one or more pseudo-random numbers based in part on the predetermined random-number criteria, scrambler key information, and/or other information (e.g., respective memory addresses of sets of data, respective input values of sets of data, etc.). In accordance with an aspect, as desired, the value of a set of descrambled data can be utilized as a pseudo-random number, or further processing can be performed to generate a pseudo-random number.

In accordance with another aspect, if the scrambling is based on the scrambler key and the input value, one pseudo-random number can be generated when the scrambler key is changed after a reset of all or a portion of the storage locations 352 in the secure memory component 106. If the scrambling is based on the respective memory addresses of the respective storage locations 352 in the secure memory component 106 as well as the scrambler key and input values, when the scrambler key is changed after a reset, a different pseudo-random number can be generated with regard to each storage location 352, which can result in a specified number of pseudo-random numbers being generated based in part on the number of storage locations 352 from which the data is read and descrambled. As a result, one or more pseudo-random numbers can be generated quickly and efficiently. At this point, methodology 900 can end.

Figure 10:
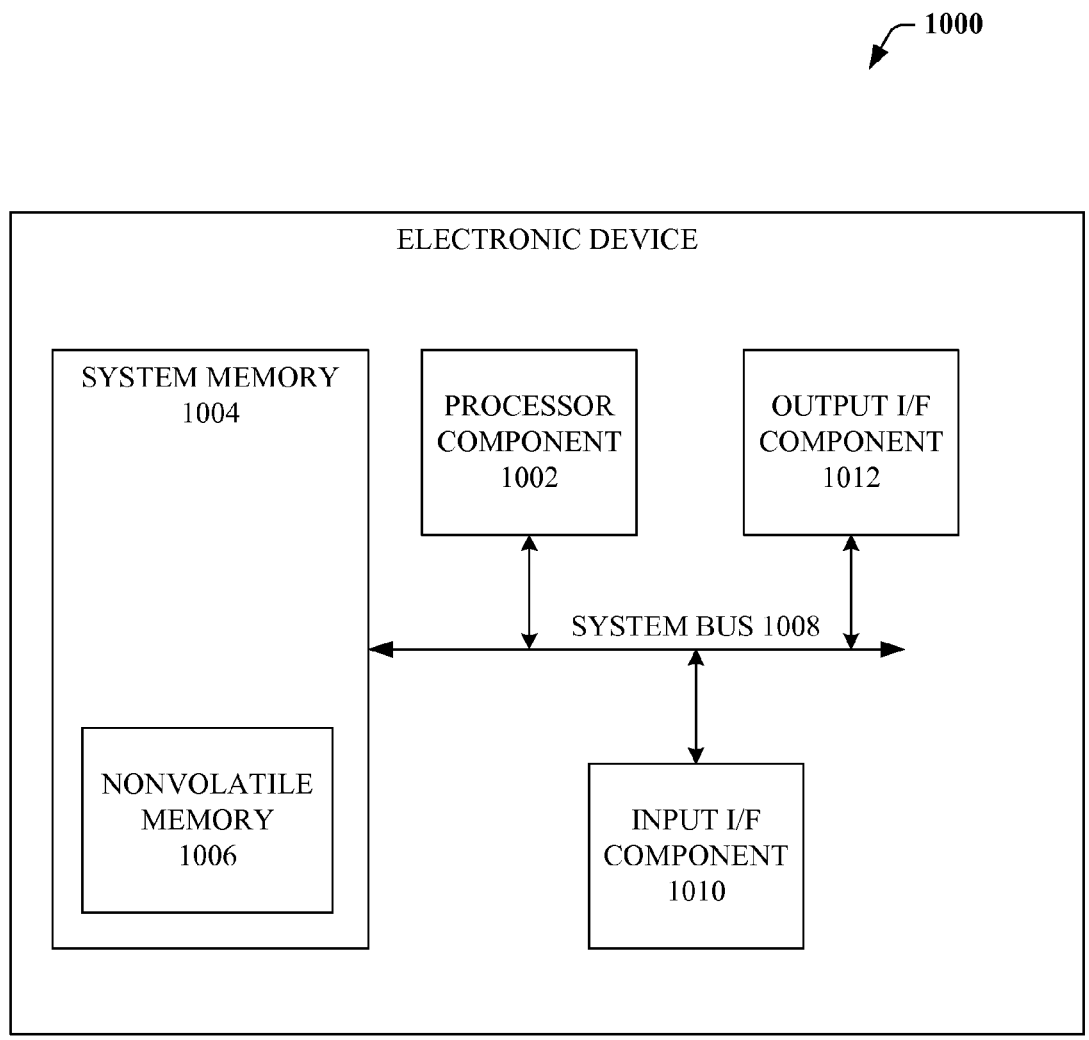
FIG. 10 is a block diagram of an exemplary electronic device that can utilize a memory component(s) in accordance with an aspect of the disclosed subject matter.

Referring to FIG. 10, illustrated is a block diagram of an exemplary, non-limiting electronic device 1000 that can incorporate system 100, system 200, system 300, system 350, and/or system 400, or a portion(s) thereof, and/or can utilize and implement methodology 500, methodology 600, methodology 700, methodology 800, and/or methodology 900, or a portion(s) thereof. The electronic device 1000 can include, but is not limited to, a computer, a laptop computer, network equipment (e.g., routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), a set-top box, a digital video recorder, a gaming console, a navigation system or device (e.g., global position satellite (GPS) system), a secure memory device with computational capabilities, a device with a tamper-resistant chip(s), an electronic device associated with an industrial control system, an embedded computer in a machine (e.g., an airplane, a copier, a motor vehicle, a microwave oven, . . . ), and the like.

Components of the electronic device 1000 can include, but are not limited to, a processor component 1002, a system memory 1004 (with nonvolatile memory 1006), and a system bus 1008 that can couple various system components including the system memory 1004 to the processor component 1002. The system bus 1008 can be any of several types of bus structures including a memory bus or memory controller, a peripheral bus, or a local bus using any of a variety of bus architectures.

Electronic device 1000 can typically include a variety of computer readable media. Computer readable media can be any available media that can be accessed by the electronic device 1000. By way of example, and not limitation, computer readable media can comprise computer storage media and communication media. Computer storage media can include volatile and/or non-volatile, removable and/or non-removable media implemented in any method or technology for storage of information such as computer readable instructions, data structures, program modules, or other data. Computer storage media can include, but is not limited to, RAM, SRAM, nonvolatile memory 1306 (e.g., flash memory, EEPROM, EPROM, ROM, NVRAM, etc.), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1000. Communication media typically embodies computer readable instructions, data structures, program modules or other data in a modulated data signal such as a carrier wave or other transport mechanism and includes any information delivery media.

The system memory 1004 can include computer storage media in the form of volatile and/or nonvolatile memory 1006 (e.g., memory array 104). A basic input/output system (BIOS), containing the basic routines that help to transfer information between elements within electronic device 1000, such as during start-up, can be stored in memory 1004. Memory 1004 typically also contains data and/or program modules that can be immediately accessible to and/or presently be operated on by processor component 1002. By way of example, and not limitation, system memory 1004 can also include an operating system, application programs, other program modules, and program data. In one embodiment, system memory 1004 can comprise the memory component 102, including the secure memory component 106 and security memory component 108, such as more fully described herein.

The nonvolatile memory 1006 can be removable or non-removable. For example, the nonvolatile memory 1006 can be in the form of a removable memory card or a USB flash drive. In accordance with one aspect, such nonvolatile memory 1006 can include flash memory (e.g., single-bit flash memory, multi-bit flash memory), ROM, PROM, EPROM, EEPROM, or NVRAM (e.g., FeRAM), or a combination thereof, for example. Further, a flash memory can comprise NOR flash memory and/or NAND flash memory.

A user can enter commands and information into the electronic device 1000 through input devices (not shown) such as a keypad, microphone, tablet or touch screen although other input devices can also be utilized. These and other input devices can be connected to the processor component 1002 through input interface component 1010 that can be connected to the system bus 1008. Other interface and bus structures, such as a parallel port, game port or a universal serial bus (USB) can also be utilized. A graphics subsystem (not shown) can also be connected to the system bus 1008. A display device (not shown) can be also connected to the system bus 1008 via an interface, such as output interface component 1012, which can in turn communicate with video memory. In addition to a display, the electronic device 1000 can also include other peripheral output devices such as speakers (not shown), which can be connected through output interface component 1012.

As used herein, terms "component", "system", "interface", and the like can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The word "exemplary" is used herein to mean serving as an example, instance, or illustration. Any aspect or design described herein as "exemplary" is not necessarily to be construed as preferred or advantageous over the other aspects or designs.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes", "has", or "having", or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates securing data associated with a memory component, comprising:
   at least one memory that stores computer executable components; and
   at least one processor that executes the following computer executable components stored in the at least one memory:
      a secure memory component comprising a plurality of storage locations in which data is stored, the secure memory component is associated with the memory component;
      a security component configured to transmit a reset signal to facilitate erase or reset of a subset of the plurality of storage locations to store a defined data value and change a first scrambler key to a disparate scrambler key, in response to detecting a security-related event based in part on predetermined reset criteria, wherein the first scrambler key is changed to the disparate scrambler key after the erase or reset of the subset of the plurality of storage locations, and the subset of storage locations comprises a first storage location associated with a first memory address value and a second storage location associated with a second memory address value;
      a scrambler component configured to:
      receive the defined data value and the first memory address value associated with the first storage location, and the defined value and the second memory address value associated with the second storage location, and
      descramble a combination of the defined data value and the first memory address value associated with the first storage location, and descramble a combination of the defined data value and the second memory address value associated with the second storage location, respectively, as a function of the disparate scrambler key, to generate a first set of descrambled data and a second set of descrambled data, respectively, to facilitate generation of a first random number and a second random number; and a random number generation component configured to receive the first set of descrambled data and the second set of descrambled data, and generate the first random number and the second random number based in part on the first set of descrambled data, the second set of descrambled data, and predetermined random-number criteria.

2. The system of claim 1, wherein the secure memory component is further configured to receive the reset signal and propagate the reset signal to each of the subset of the plurality of storage locations at a same time or substantially the same time and the subset of the plurality of storage locations are erased or reset in a single clock cycle to remove content stored therein.

3. The system of claim 1, wherein the security-related event is at least one of a security breach or completion of at least one of a security process, a security function, or a security computation.

4. The system of claim 3, wherein the at least one of the security process, the security function, or the security computation relates to at least one of cryptography, authentication, or random number generation.

5. The system of claim 3, wherein the security breach relates to at least one of temperature level, voltage level, a voltage glitch, authentication of an entity, an attack using ultraviolet (UV) light, an attack using a laser, an attack using a white light, an attack using pressure variations, an attack using heavy ions, an attack using radio frequency (RF) energy, an attack using clock transients, an attack using power transients, variance in a resistance level of a shield, or integrity of a casing, associated with the memory component.

6. The system of claim 1, wherein the predetermined reset criteria relates to at least one of type of memory; expected value or range of values of a security-related attribute; type of security breach; level of severity of the security breach;
or performance or completion of a secure process, a secure function, or a secure computation.

7. The system of claim 1, further comprising:
a sensor component configured to monitor and evaluate activity associated with the memory component to determine whether a security-related event is detected, and in response to detecting the security-related event, the sensor component is configured to automatically transmit the reset signal to the secure memory component to facilitate automatic erase or reset of the subset of the plurality of storage locations, wherein the security-related event comprises a security breach.

8. The system of claim 1, further comprising a cryptographic component configured to change the first scrambler key to the disparate scrambler key in response to detecting the security-related event.

9. The system of claim 1, wherein the security component is further configured to perform a secure computation on data to generate secure computation results data as part of a secure process and store the secure computation results data in at least one storage location of the plurality of storage locations, and, in response to a determination that the secure process is completed, transmit the reset signal to facilitate erase of the secure computation results data from the at least one storage location and to store the defined data value in the at least one storage location.

10. The system of claim 1, further comprising:
an intelligent component configured to infer an automated function to automatically perform to facilitate securing data associated with the secure memory component, wherein the automated function relates to at least one of cryptography, authentication of an entity, or random number generation, associated with the secure memory component.

11. The system of claim 1, wherein the secure memory component comprises a plurality of blocks that each contain a specified number of storage locations, and each block is associated with a block reset component and each storage location is associated with a storage reset component, wherein the secure memory component is further configured to receive the reset signal and the reset signal is propagated to at least one selected block reset component, which propagates the reset signal to each storage reset component within the at least one selected block reset component, to facilitate the erase or reset of storage locations associated with the at least one selected block reset component in a single clock cycle to remove content stored therein.

12. An electronic device comprising the system of claim 1.

13. The electronic device of claim 12, wherein the electronic device comprises at least one of a computer, a laptop computer, network equipment, a media player, a media recorder, a television, a smart card, a phone, a cellular phone, a smart phone, an electronic organizer, a personal digital assistant, a portable email reader, a digital camera, an electronic game, an electronic device associated with digital rights management, a Personal Computer Memory Card International Association (PCMCIA) card, a trusted platform module (TPM), a Hardware Security Module (HSM), a set-top box, a digital video recorder, a gaming console, a navigation device, a secure memory device with computational capabilities, a device with at least one tamper-resistant chip, an electronic device associated with an industrial control system, or an embedded computer in a machine, wherein the machine comprises one of an airplane, a copier, a motor vehicle, or a microwave oven.

14. A method that facilitates securing data associated with a memory, comprising:
employing at least one processor to facilitate execution of code instructions retained in at least one memory device, the at least one processor, in response to execution of the code instructions, performs operations comprising:
detecting a security-related event associated with the memory;
at least one of erasing or resetting a subset of storage locations in a secure memory component in response to detecting the security-related event based in part on predetermined reset criteria, wherein the subset of storage locations store sets of data of predefined values in response to the at least one of erasing or resetting the subset of storage locations, and the subset of storage locations comprises a first storage location associated with a first memory address value and storing a first set of data of predefined value, and a second storage location associated with a second memory address value and storing a second set of data of predefined value;
changing a first scrambler key to a second scrambler key, in response to detecting the security-related event;
descrambling a combination of the first memory address value and the first set of data, and a combination of the second memory address value and the second set of data, respectively, as a function of the second scrambler key, to respectively generate a first set of descrambled data and a second set of descrambled data to facilitate generating a first random number and a second random number; and
generating the first random number and the second random number based in part on the first set of descrambled data, the second set of descrambled data, and predetermined random-number criteria.

15. The method of claim 14, further comprising:
monitoring activity associated with the memory;
detecting a security breach associated with the memory;
automatically transmitting a reset signal to the subset of storage locations in the secure memory component in response to detecting the security breach; and
at least one of erasing or resetting the subset of storage locations to the predefined values in a single clock cycle.

16. The method of claim 14, further comprising:
monitoring activity associated with the memory;
determining whether a security breach is detected;
determining whether to perform the reset or erase based in part on the predetermined reset criteria;
transmitting a reset signal to the subset of storage locations in the secure memory component in response to detecting the security breach and determining the reset or erase is to be performed; and
at least one of erasing or resetting to the subset of storage locations to the predefined values in a single clock cycle.

17. The method of claim 14, further comprising:
performing at least one of a secure process, a secure function, or a secure computation using the subset of storage locations to store secure data relating to the at least one of the secure process, the secure function, or the secure computation;
determining whether the at least one of the secure process, the secure function, or the secure computation is complete;
transmitting a reset signal to the subset of storage locations in the secure memory component in response to determining that the at least one of the secure process, the secure function, or the secure computation is complete; and
at least one of erasing or resetting to the subset of storage locations to the predefined values in a single clock cycle in response to the reset signal.

18. The method of claim 14, further comprising:
scrambling one or more sets of data based in part on the first scrambler key;
storing the one or more sets of scrambled data in respective storage locations;
changing the first scrambler key to a different scrambler key;
reading the one or more sets of scrambled data from the respective storage locations;
descrambling the one or more sets of scrambled data, based in part on the different scrambler key, to generate one or more sets of descrambled data; and
generating at least one random number based in part on the one or more sets of descrambled data and the predetermined random-number criteria.

19. The method of claim 18, further comprising:
generating a distinct random number for each set of the one or more sets of descrambled data based in part on respective memory addresses respectively associated with respective storage locations in which the one or more sets of descrambled data were stored.

20. The method of claim 14, wherein the predetermined reset criteria is associated with at least one of type of memory; expected value or range of values of a security-related attribute; type of security breach; level of severity of the security breach; or performance or completion of a secure process, a secure function, or a secure computation.

* * * * *